United States Patent

Shudo et al.

[11] Patent Number: 6,160,675
[45] Date of Patent: Dec. 12, 2000

[54] MAGNETIC RECORDING AND REPRODUCING APPARATUS

[75] Inventors: Katsuyuki Shudo, Yokosuka; Hisao Kinjo; Hiromichi Hirayama, both of Yokohama, all of Japan

[73] Assignee: Victor Company of Japan, Ltd., Yokohama, Japan

[21] Appl. No.: 09/079,652

[22] Filed: May 15, 1998

[30] Foreign Application Priority Data

| Apr. 22, 1997 | [JP] | Japan | 9-118711 |
| Apr. 23, 1997 | [JP] | Japan | 9-120152 |
| May 20, 1997 | [JP] | Japan | 9-145848 |
| May 16, 1997 | [JP] | Japan | 9-141104 |
| Sep. 17, 1997 | [JP] | Japan | 9-270605 |

[51] Int. Cl.[7] ................................... G11B 15/18
[52] U.S. Cl. .................. 360/72.3; 360/72.1; 360/71; 242/346.1; 242/357
[58] Field of Search .................. 360/72.3, 72.1, 360/70, 71, 130.22, 130.23, 75, 77.01; 242/335, 336, 341, 346.1, 357

[56] References Cited

U.S. PATENT DOCUMENTS

| 5,206,771 | 4/1993 | Katou et al. | 360/71 |
| 5,395,067 | 3/1995 | Kano et al. | 242/344 |
| 5,870,240 | 2/1999 | Jun | 360/71 |

FOREIGN PATENT DOCUMENTS

| 406236603 | 8/1994 | Japan | 15/60 |
| 406282910 | 10/1994 | Japan | 15/61 |
| 6-309745 | 11/1994 | Japan . | |
| 7-57351 | 3/1995 | Japan . | |

*Primary Examiner*—Paul Loomis
*Assistant Examiner*—Dan I. Davidson
*Attorney, Agent, or Firm*—Anderson, Kill & Olick P.C.

[57] ABSTRACT

A magnetic recording and reproducing apparatus has a supply reel and a take-up reel around which a magnetic tape is to be wound. A first tape guide is provided in the vicinity of a rotary head at the supply reel side and a second tape guide in the vicinity of the rotary head at the take-up reel side. The first and second tape guides are movable in directions of a width of the magnetic tape. A detector detects a height of each of the first and second tape guides. A count value corresponding to the detected height of at least either the first or the second tape guide is obtained by a counter. The height of at least either the first or the second tape guide is adjusted so that the count value becomes equal to a reference value. The count value is set to a specific value when the detected height becomes a reference height corresponding to the reference value after the magnetic tape has been wound around the supply and take-up reels.

21 Claims, 29 Drawing Sheets

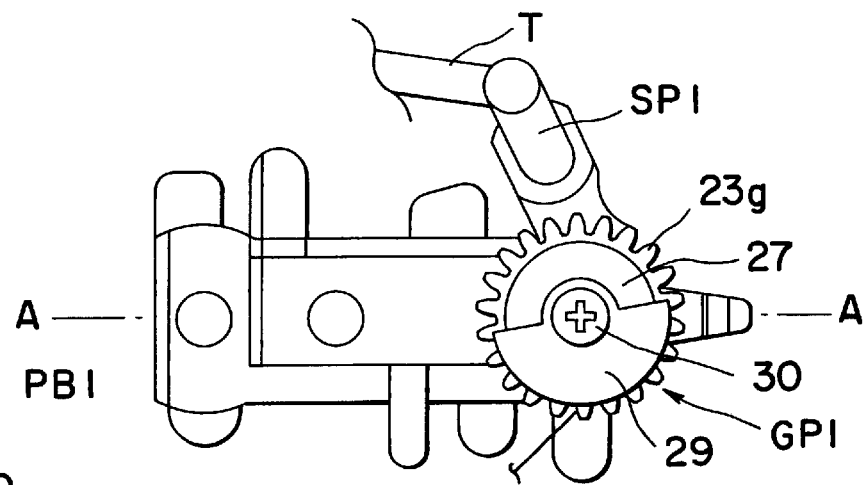
FIG. 6A
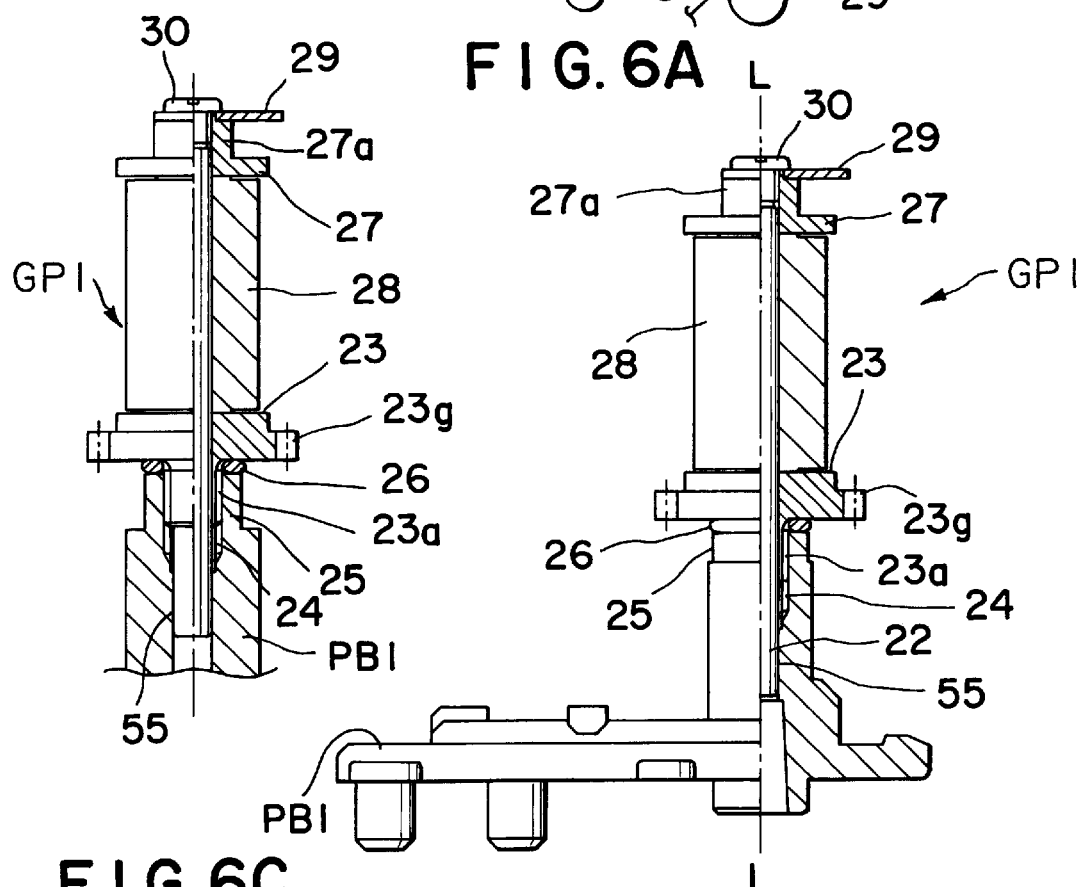
FIG. 6C
FIG. 6B

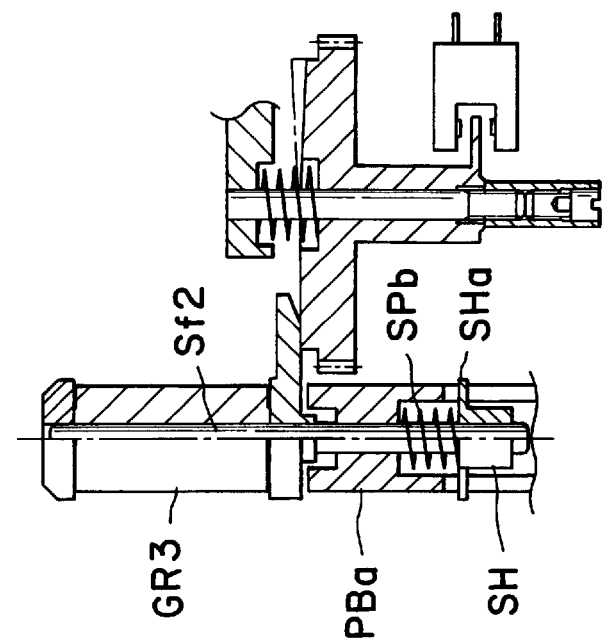
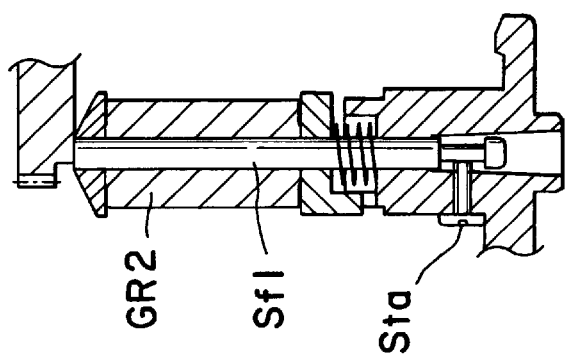
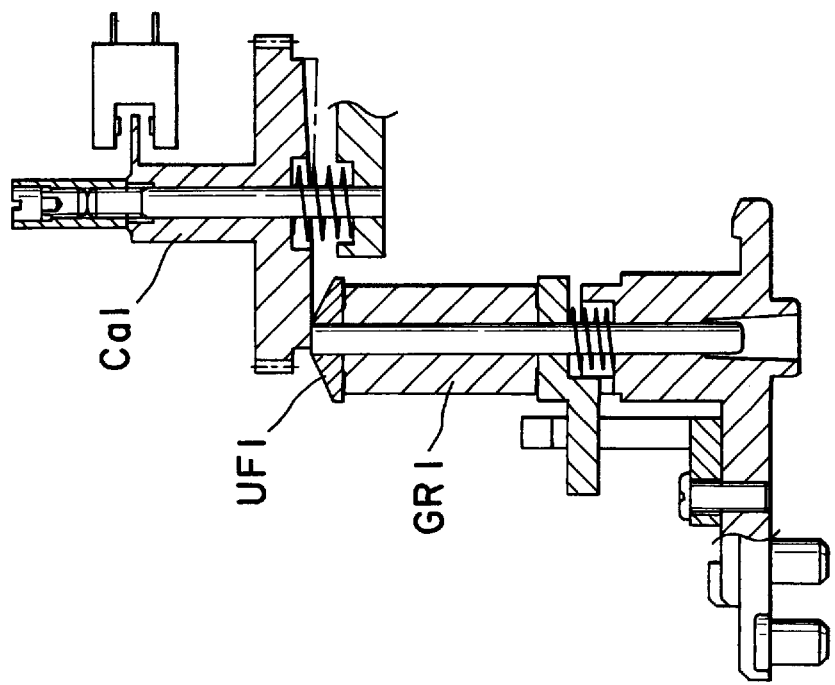

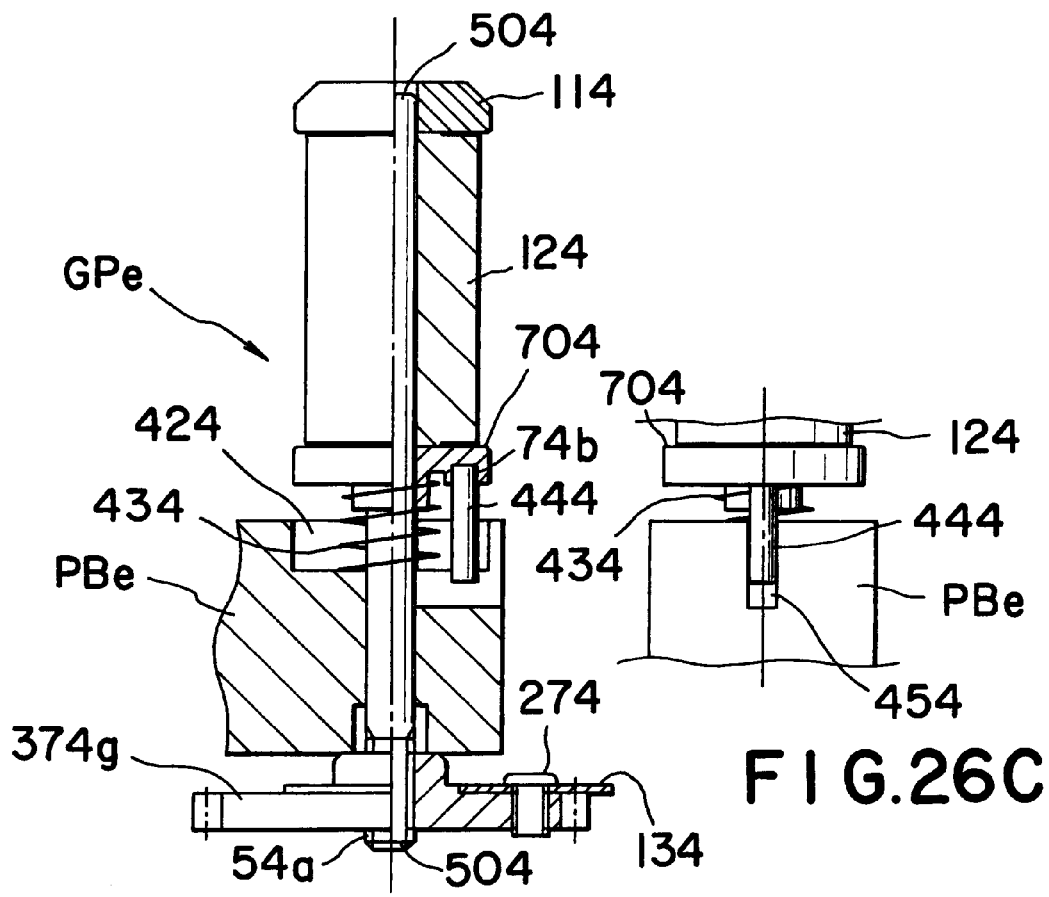
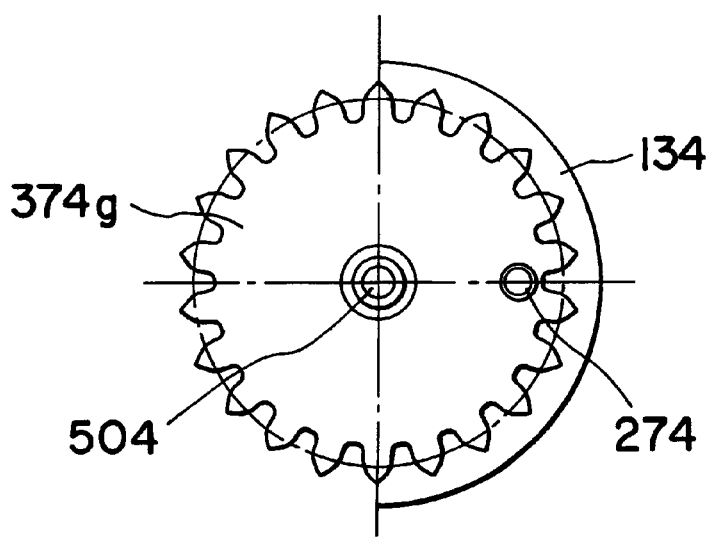
FIG. 26C
FIG. 26B
FIG. 26A

MAGNETIC RECORDING AND REPRODUCING APPARATUS

BACKGROUND OF THE INVENTION

The present invention relates to a magnetic recording and reproducing apparatus with mechanism for adjusting heights of guide poles (tape guides) provided at supply and take-up reel sides.

It is well known that track patterns formed on a magnetic tape according to rotational loci of magnetic rotary heads will be different from each other. This happens even though track patterns are formed by magnetic recording apparatuses of the same recording and reproduction standard due to difference in allowable mechanical tolerance.

This sometimes gives damage to data reproduced by a magnetic recording apparatus compatible with another magnetic recording apparatus by which the data has been recorded. The narrower the track patterns in high density recording, the more serious problem may happen.

For example, a W-VHS video tape recorder (VTR) has been proposed for recording and reproducing high vision-image data with simultaneous recording of parallel three track patterns each having 19 μm-width. Two of the parallel three track patterns are used for video signal recording and reproduction with two rotary magnetic heads having azimuth angles in opposite directions. On the other hand, the remaining track pattern is used for audio signal recording and reproduction with an audio rotary magnetic head capable of after recording.

An allowable tolerance of curve on one track pattern in the W-VHS VTR is decided as about 7 μm. This tolerance may cause about 14 μm-deviation at maximum between track patterns of a magnetic tape recorded by a first W-VHS VTR and a rotary track of a rotary magnetic head of a second W-VHS VTR compatible with the first W-VHS VTR when after recording is done by the second W-VHS VTR.

If the 14 μm-deviation happens, an audio rotary magnetic head for after recording of the second W-VHS VTR will be displaced from audio track patterns on the magnetic tape by 14 μm to adjacent video track patterns each having 19 μm-width. This results in recording of audio signal for after recording over a 14 μm-width portion of the video track patterns each having 19 μm-width.

Therefore, a reproduced video signal will be degraded because a 5 μm-width portion only remains as the video signal.

SUMMARY OF THE INVENTION

A purpose of the present invention is to provide a magnetic recording and reproducing apparatus capable of cancelling difference in allowable mechanical tolerance that would affect track patterns on a magnetic tape.

The present invention provides a magnetic recording and reproducing apparatus comprising: a supply reel and a take-up reel around which a magnetic tape is to be wound; a first tape guide provided in the vicinity of a rotary head at the supply reel side; a second tape guide provided in the vicinity of the rotary head at the take-up reel side, the first and second tape guides being movable in directions of a width of the magnetic tape; a first detector to detect a height of the first and second tape guide; a second detector to detect a height of the second tape guide; a first counter and a second counter to obtain a count value corresponding to each detected height of the first and second tape guides respectively; an adjuster to adjust the height of at least either the first or the second tape guide so that the count value becomes equal to a reference value; and means for setting the count value to a specific value when the detected height becomes a reference height corresponding to the reference value after the magnetic tape has been wound around the supply and take-up reels.

Further, the present invention provides a magnetic recording and reproducing apparatus comprising: a supply reel and a take-up reel around which a magnetic tape is to be wound; tape guides provided in the vicinity of a rotary head at the supply reel and the take-up reel sides, the tape guides being movable in directions of a width of the magnetic tape; a driver to move the tape guides in the tape width direction; a detector to detect a height of each tape guide and to generate a first reference signal when at least either one of the tape guides is moved to a first reference height in a first direction and a second reference signal when at least either one of the tape guides is moved to a second reference height in a second direction opposite to the first direction of the width of the magnetic tape; a counter to count the number of pulses generated while at least either one of the tape guides is moving; and a memory to store a first number of pulses counted when the first reference signal is generated and a second number of pulses counted when the second reference signal is generated, the driver moving at least either one of the tape guides based on at least a first difference between the first and the second number of pulses.

Further, the present invention provides a magnetic recording and reproducing apparatus comprising: a supply reel and a take-up reel around which a magnetic tape is to be wound; tape guides provided in the vicinity of a rotary head at the supply reel and the take-up reel sides, the tape guides being movable in directions of a width of the magnetic tape; a driver to move the tape guides in the tape width direction; a counter to count the number of pulses generated while at least either one of the tape guides is moving; and a detector to detect a count number of pulses when at least either one of the tape guides is moved at a specific speed and then stopped, the driver moving at least either one of the tape guides based on the detected count number of pulses.

BRIEF DESCRIPTION OF THE DRAWINGS

FIGS. 6A to 6C are illustrations of a guide pole provided on a pole base;

FIG. 19 is a sectional view of a guide roller;

FIG. 20 is a sectional view of another guide roller;

FIG. 21 is a sectional view of still another guide roller;

FIGS. 26A to 26C are illustrations of a still further guide pole provided on a pole base;

DETAILED DESCRIPTION OF PREFERRED EMBODIMENTS

Preferred embodiments according to the present invention will be described with reference to the attached drawings. Through the drawings, elements in the embodiments that are the same as or analogous to each other are referenced by the same reference signs and numerals.

Figure 1:
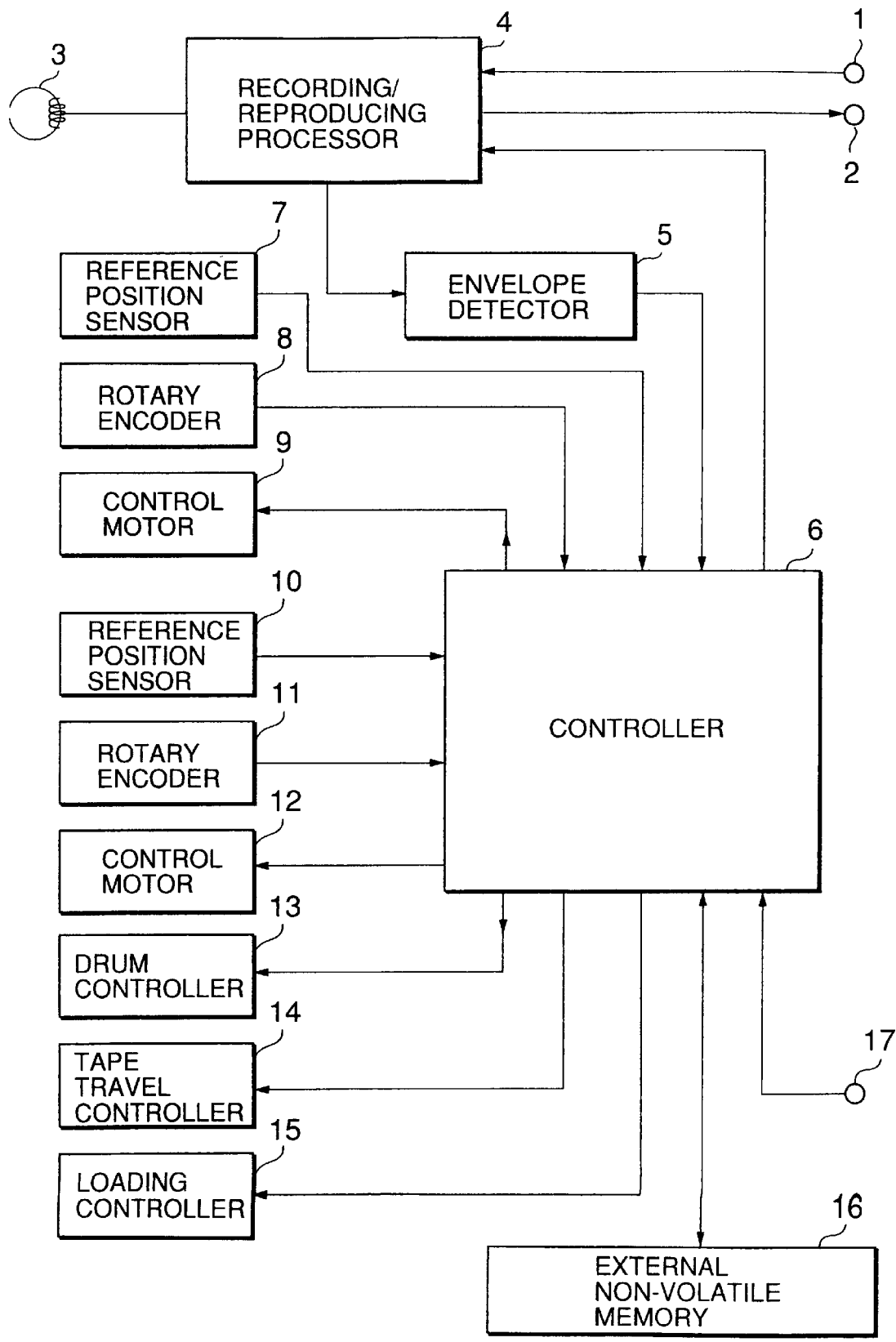
FIG. 1 is a block diagram of a magnetic recording and reproducing apparatus according to the present invention.

In FIG. 1, a signal to be recorded is supplied to a recording and reproducing processor 4 via an input terminal 1. The signal is processed by the processor 4 and recorded on a magnetic tape (not shown) via a rotary magnetic head 3.

In reproduction, the recorded signal is reproduced from the magnetic tape via the rotary magnetic head 3. The reproduced signal is processed by the recording and reproducing processor 4 and output via an output terminal 2.

During the reproduction, the recording and reproducing processor 4 supplies a reproduced frequency-modulated signal to an envelope detector 5 that outputs an envelope signal to a controller 6.

The controller 6 controls the overall function of a recording and reproducing apparatus of FIG. 1 in response to a control signal supplied thereto via an input terminal 17. The controller 6 may include a CPU, ROMs, RAMs, counters, up/down counters and so on.

The envelope signal indicates how much a magnetic track of the recorded signal on the magnetic tape is curved. And this envelope signal is used for adjusting first and second guide poles (tape guides) arranged at supply and take-up reel sides, respectively, along a tape travel passage by closed-loop automatic control to make the magnetic track meet a rotary track of the rotary magnetic head.

The controller 6 supplies control data to a drum controller 13 and a tape travel controller 14. The controller 13 rotates a drum drive motor (which will be described later) at a predetermined rotation speed and phase. The controller 14 control the magnetic tape to travel at a predetermined travel speed and phase. The controller 6 further controls a loading controller 15 as described later.

A reference position sensor 7, a rotary encoder 8 and a control motor 9 constitute a first height adjustment mechanism for adjusting a height of the first guide pole provided at the supply reel side.

On the other hand, a reference position sensor 10, a rotary encoder 11 and a control motor 12 constitute a second height adjustment mechanism for adjusting a height of the second guide pole provided at the take-up reel side.

The first and second height adjustment mechanisms will be described with reference to FIGS. 2A to 2C.

Figure 2A:
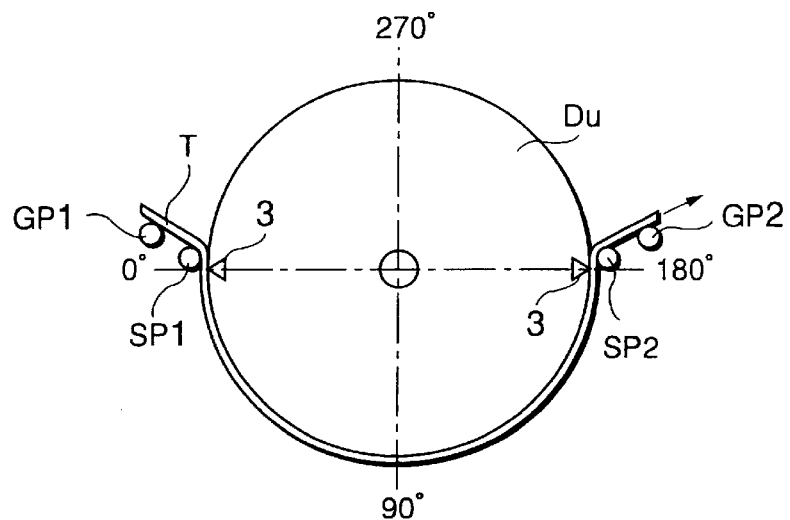
FIGS. 2A to 2C are illustrations for explaining a disadvantage of a conventional magnetic recording and reproducing apparatus.
Figure 2B:
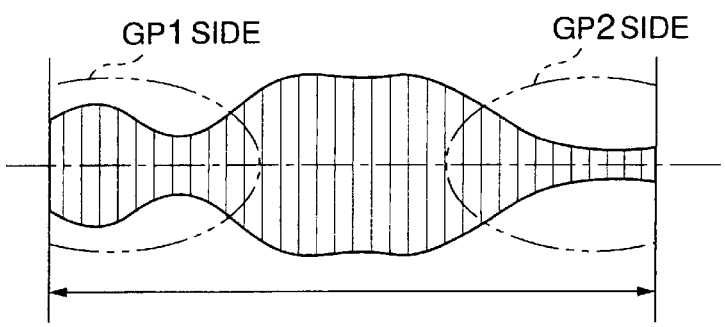
Figure 2C:
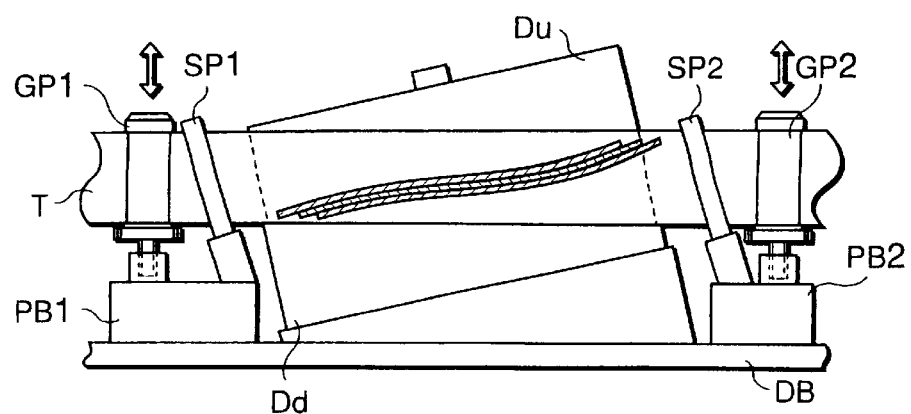

FIG. 2C shows an upper drum Du, a lower drum Dd and a drum base DB. First and second pole bases PB1 and PB2 also shown in FIG. 2C are provided in a loading mechanism.

Provided on the pole bases PB1 and PB2 are a first guide pole GP1 and a first slant pole SP1, and a second guide pole GP2 and a second slant pole SP2, respectively. The guide poles GP1 and GP2 are movable in a direction vertical to the pole bases PB1 and PB2, respectively. The guide poles GP1 and GP2 will be moved to predetermined positions at the supply and take-up reel sides, respectively, when a loading operation by the loading mechanism is completed.

FIG. 2A is a plan view showing the state of the upper drum Du and its peripheral portions when the loading operation is completed.

An envelope of a reproduced frequency-modulated signal reproduced by the rotary magnetic head 3 will have a rectangular shape when a magnetic tape T has recorded data on sequential straight tracks like an alignment tape (a reference tape for adjustment) and heights of the guide poles GP1 and GP2 are both a predetermined reference heights while the magnetic tape T is travelling along the upper and lower drums Du and Dd around which it is wound by 180 degrees (drum center angle) or more.

However, if the heights of the guide poles GP1 and GP2 are not the reference heights, an envelope of the reproduced frequency-modulated signal will have a wave like form as shown in FIG. 2B that depends on the heights of the guide poles GP1 and GP2 even if the magnetic tape T has recorded data on sequential straight tracks.

Moreover, even if the heights of the guide poles GP1 and GP2 are the predetermined reference height, when the magnetic tape T has recorded data on curved tracks as shown in FIG. 2C, an envelope of the reproduced frequency-modulated signal will also have a wave like form as shown in FIG. 2B.

This invention provides a closed-loop automatic guide pole-height control system that makes a track on a magnetic tape meet a rotary track of a rotary magnetic head.

In detail, the closed-loop control system detects curve data according to change in envelope of a frequency-modulated signal reproduced from a magnetic tape to generate height control signals. The curve data indicates how much both ends of data-recorded track are curved. Heights of guide poles are adjusted based on the height control signals so that the reproduced frequency-modulated signal will have a rectangular shape.

Figure 3:
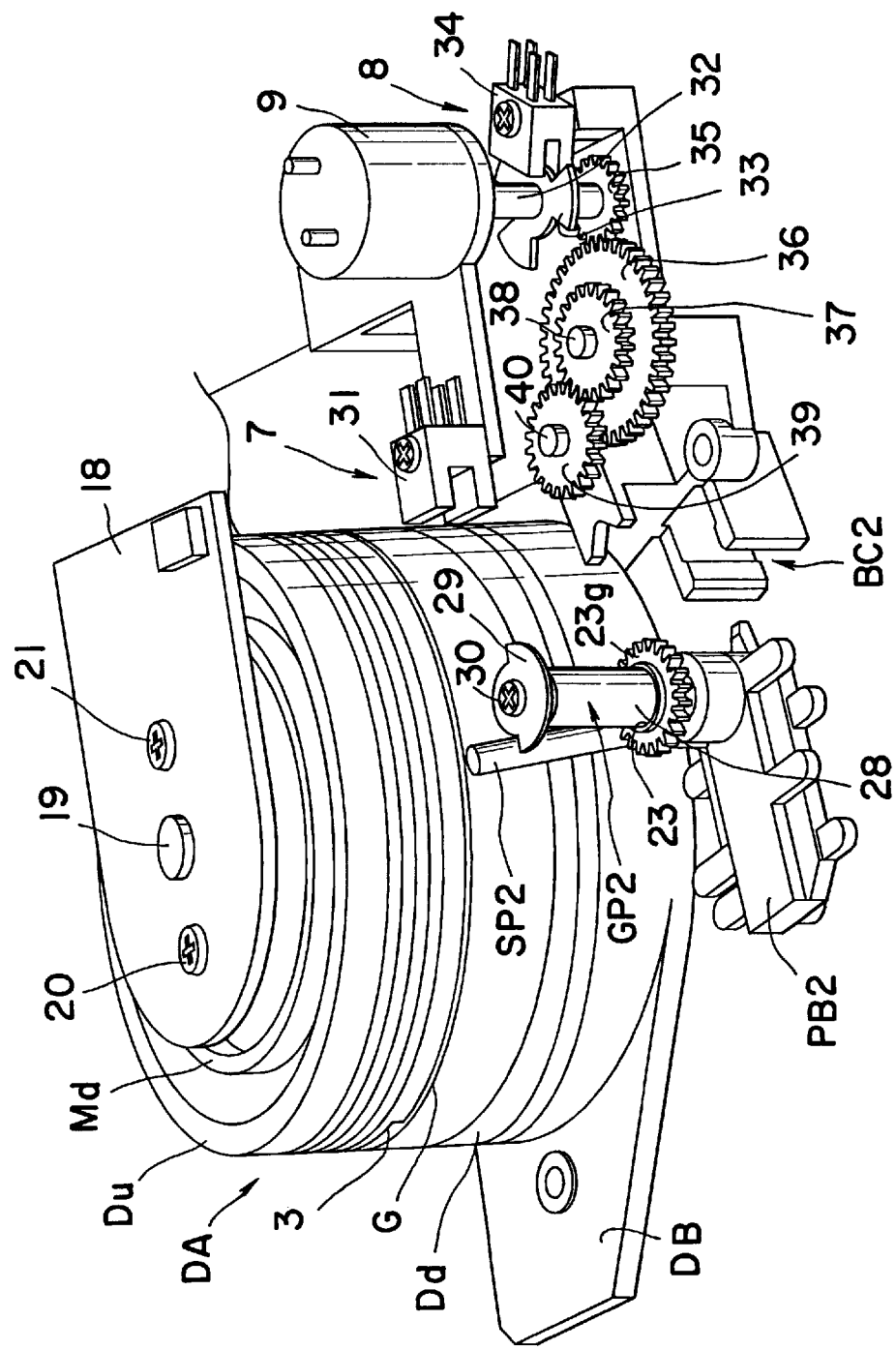
FIG. 3 is a perspective illustration of an embodiment of the magnetic recording and reproducing apparatus according to the present invention during tape loading.
Figure 4:
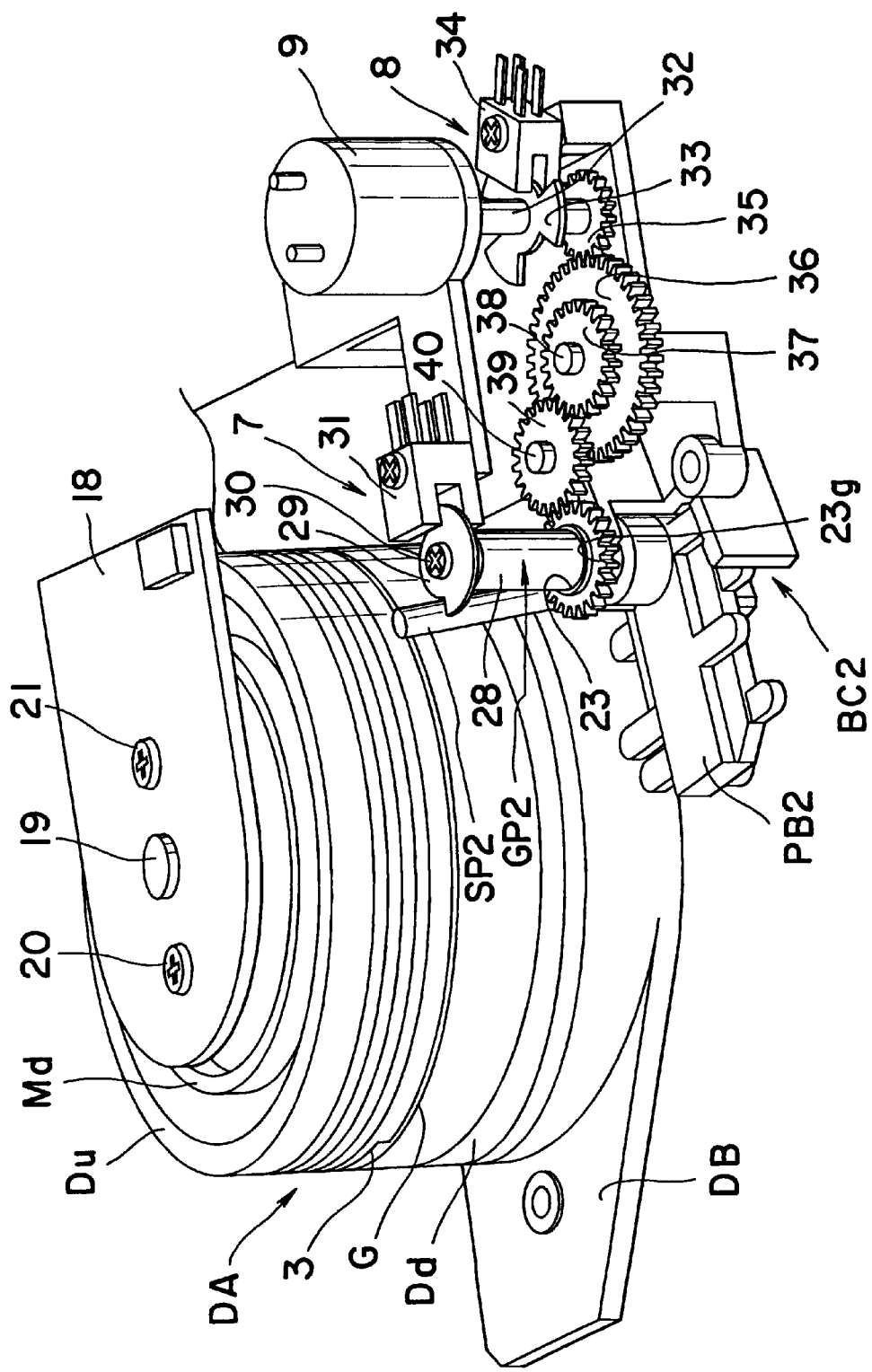
FIG. 4 is a perspective illustration of the embodiment of the magnetic recording and reproducing apparatus according to the present invention when the tape loading is completed.
Figure 5:
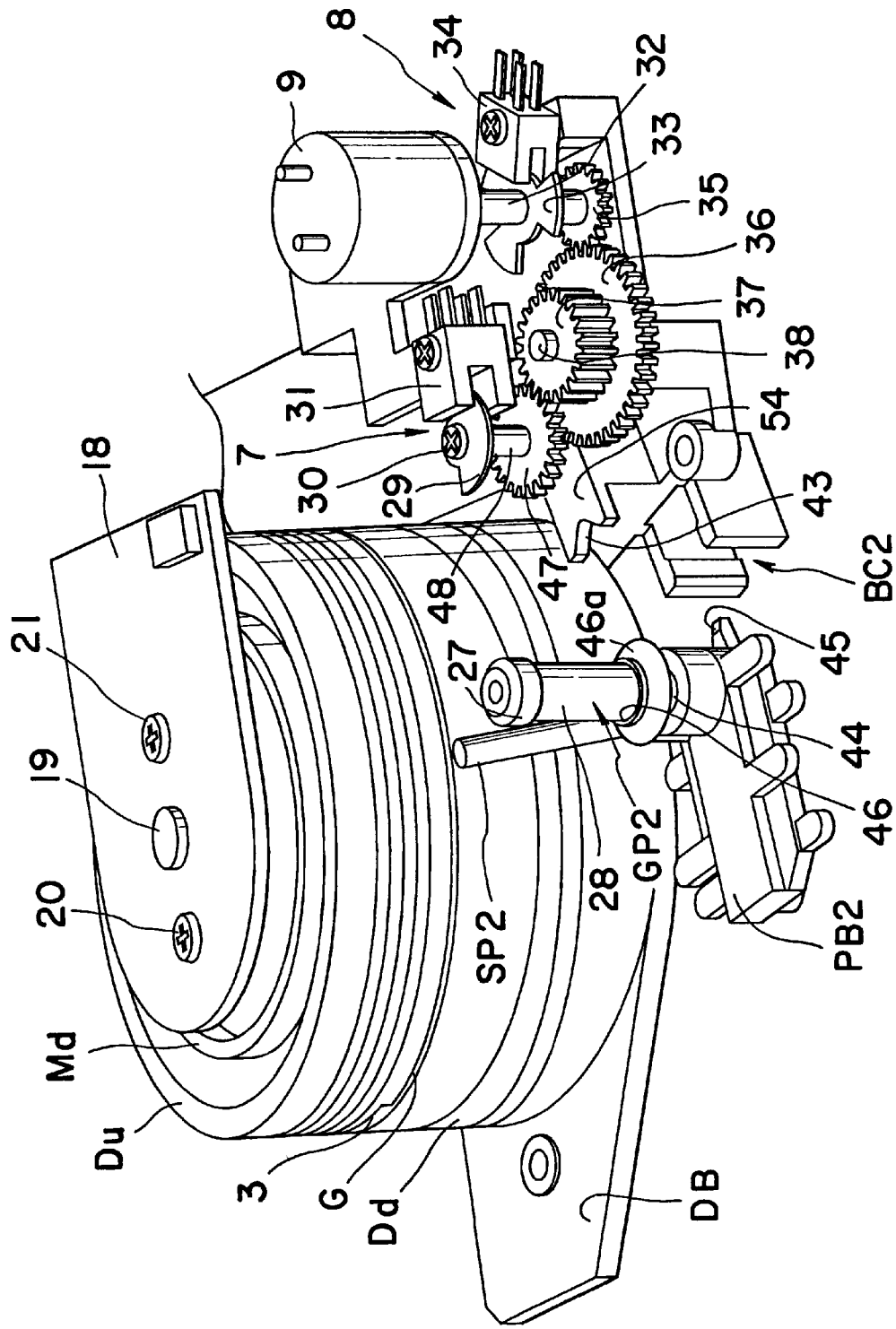
FIG. 5 is a perspective illustration of another embodiment of the magnetic recording and reproducing apparatus according to the present invention during tape loading.

In FIGS. 3, 4 and 5, the upper and lower drums Du and Dd on the drum base DB constitute a drum body (assembly) DA. The drum base DB is mounted on a fixed section of the recording and reproducing apparatus. Provided in the upper drum Du is a drum drive motor Md, its rotor being fixed to the upper drum Du. The upper drum Du is a rotary drum in the description below.

A plate 18 is provided over the drum body DA to which a stator of the drum drive motor Md is fixed with threads (screws) 20 and 21. A center shaft 19 of the drum body DA is fixed on a center portion of the lower drum Dd which is fixed on the drum base DB. The drum base DB is further provided with two base catchers BC (only one shown for brevity).

The upper and lower drums Du and Dd are arranged so as to have a gap G therebetween and the magnetic rotary head 3 is provided just above the gap G. The magnetic rotary head 3 will form rotary tracks at predetermined positions with respect to the fixed section of the recording and reproducing apparatus.

A plurality of the magnetic rotary heads can be provided according to recording and reproducing methods employed by the magnetic recording and reproducing apparatus.

The loading mechanism is provided with the first guide pole GP1 and the first slant pole SP1 both mounted on the first pole base PB1, and the second guide pole GP2 and the second slant pole SP2 both mounted on the second pole base PB2.

The loading mechanism pulls out a magnetic tape from a cassette (not shown) in loading operation. And when the magnetic tape is wound around predetermined outer surfaces of the upper and lower drums Du and Dd in completion of loading operation, the pole base PB1 is moved so that the guide pole GP1 and the slant pole SP1 are located at the supply reel side along the tape travel passage, on the other hand, the pole base PB2 is moved so that the guide pole GP2 and the slant pole SP2 are located at the take-up reel side along the tape travel passage.

The first and second pole bases PB1 and PB2 are fixed on a link (not shown), for example, of the loading mechanism and movable along guide rails (not shown).

In completion of loading operation, the pole bases PB1 and PB2 will be engaged with base catchers BC1 and BC2, respectively. Accordingly, in completion of loading operation, the pole bases PB1 and PB2 will be located in cavities having predetermined positional relationships in left and right, and up and down directions with respect to the fixed section of the magnetic recording and reproducing apparatus.

In this regard, in FIGS. 3, 4 and 5, the second guide pole GP2, slant pole SP2 and pole base PB2 only are shown for brevity. The first guide pole GP1, slant pole SP1 and pole base PB1 exist on the opposite side of the drum body DA.

FIGS. 6A to 6C show the structure of the guide pole GP1, however, it is common to the guide poles GP1 and GP2.

An end portion of a shaft 22 is inserted into a hole 55 formed on the pole base PB1 that will restrict transfer directions of the shaft 22. A lower flange 23 is fixed around the shaft 22 with a gear 23g at lower outer surface of the flange 23. Further, a male thread (screw) 23a is formed around an outer surface of a boss of the gear 23g. The gear 23g is a secondary gear that is engaged with a primary (drive) gear of a first height control mechanism provided at the fixed section of the magnetic recording and reproducing mechanism and will be rotated to follow the rotation of the primary gear as disclosed later.

The male thread 23a is screwed into a female thread 24 provided on the pole base PB1. The female thread 24 is longer than the male thread 23a so that, when the shaft 22 is rotated, the guide pole GP1 will be moved in directions along a center line L of the shaft 22. The male thread 23a may be formed around an outer surface of shaft 22.

Provided around the shaft 22 and between the gear 23g and an upper end portion 25 of the pole base PB1 is an elastic ring 26 such as a rubber ring. The elastic ring 26 always pushes the gear 23g upwards so that the threads 23a and 24 are tightly engaged with each other. Therefore, the gear 23g will be rotated only by a force give by the primary gear of the first height control mechanism.

Provided over the lower flange 23 is an upper flange 27 with a protrusion 27a that is fixed around the shaft 22. A roller 28 is provided between the flanges 23 and 27 with a length equal to a width of a magnetic tape. Mounted on an upper surface of the protrusion 27a by a screw 30 is a semicircular shield plate 29.

In FIGS. 3, 4 and 5, a photointerpreter (photointerrupter) 31 is provided to cooperate with the shield plate 29 as parts of the reference position detector 7(10).

The rotary encoder 8(11) in FIGS. 3, 4 and 5 will generate pulses carrying data indicative of a rotation direction and a rotation number of a shaft 32 of the control motor 9(12). The rotary encoder 8(11) is constructed by a shield wing plate 33 and a photointerpreter 34 provided around the shaft 32 of the control motor 9(10).

Also provided around the shaft 32 is a gear 35 engaged with a gear 36 with a rotary shaft 38 of a power transfer system. A gear 37 is mounted on the gear 36 and engaged with a gear 39 with a rotary shaft 40. The gear 39 is the primary gear of a fixed-side height adjustment mechanism provided at the fixed section of the magnetic recording and reproducing mechanism.

In loading operation, the pole base PB1(2) is moved from the cassette to the drum body DA side along a predetermined transfer passage. Then, when the loading operation is completed, an end portion of the pole base PB1(2) is engaged with the base catcher BC1(2) to make the secondary gear 23g of the first (second) height adjustment mechanism provided at pole base side to engage with the primary gear 39 of the fixed-side height adjustment mechanism.

Figure 7A:
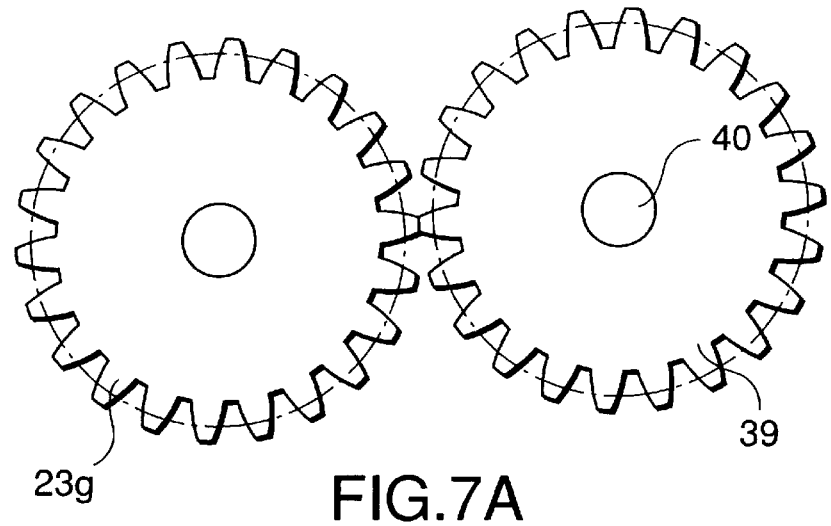
FIGS. 7A to 7C are illustrations of gear engagement.
Figure 7B:
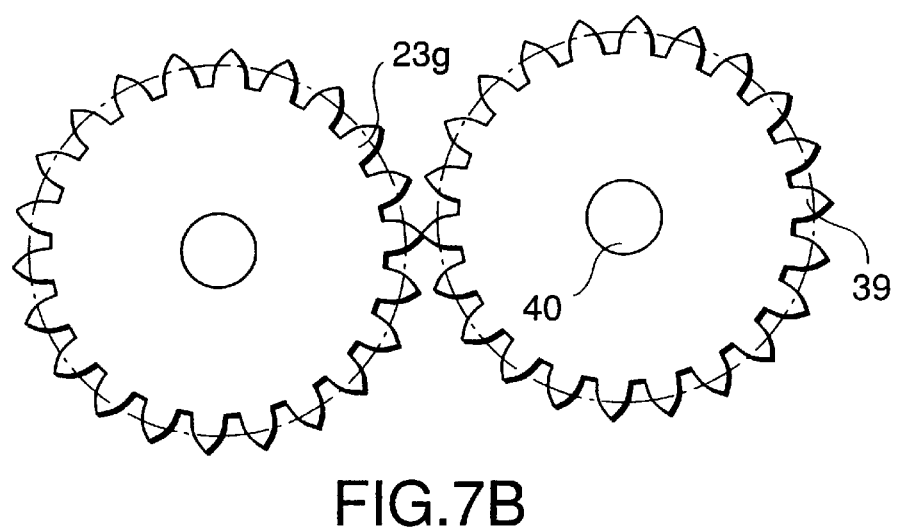
Figure 7C:
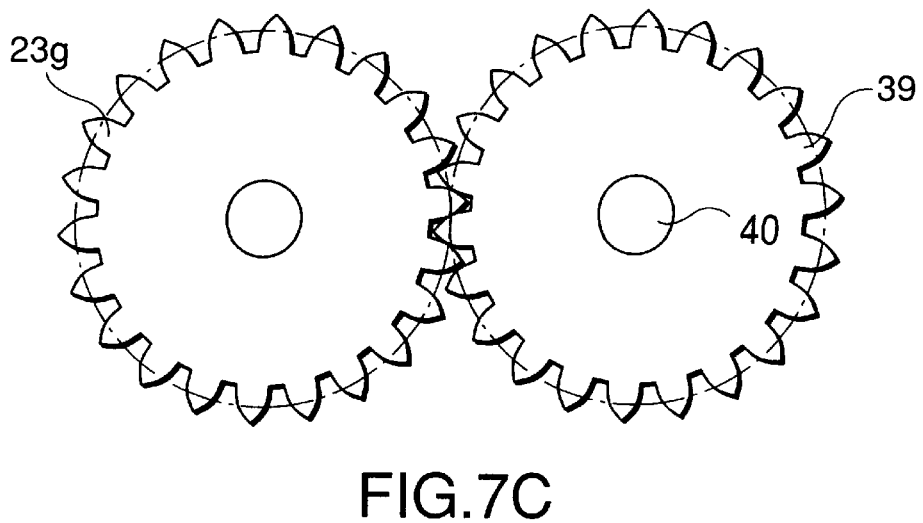

A summit of each tooth of the gears 23g and 39 may be formed with no flat portion for their complete engagement and also engagement of the pole base PB1(2) and the base catcher BC1(2) as shown in FIGS. 7B and 7C so as to avoid incomplete engagement as shown in FIG. 7A.

Figure 8A:
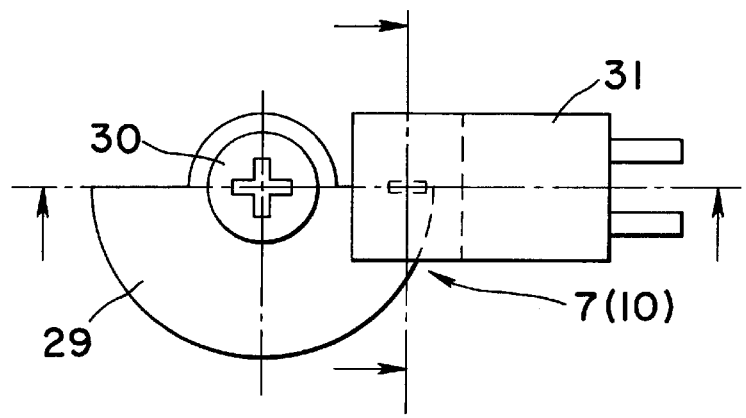
FIGS. 8A and 8B are illustrations for explaining an operation of a reference position sensor.
Figure 8B:
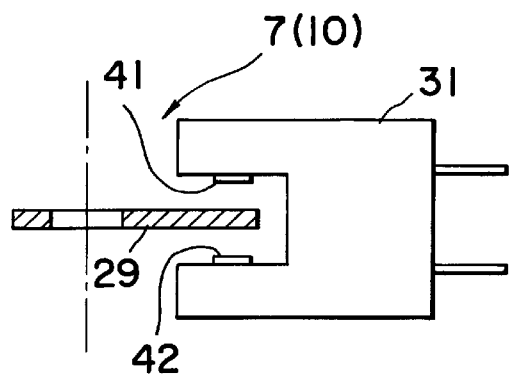

FIGS. 8A and 8B explain reference position detection by the reference position sensor 7 (10) with the shield plate 29 and the photointerpreter 31. The sensor 7(10) is also provided with a light emitting element 41 and a light receiving element 42. The sensor 7 will generate a positional signal when the shield 29 enters in between the light emitting and receiving elements 41 and 42 and goes out therefrom.

The shield 29 may be of reflection type by which a beam of light emitted from the light emitting element 41 is received by the light receiving elements 42. Further, the reference position sensor 7(10) may be of magnetic type with a permanent-magnet and a magnetic detection element such as a Hall-effect element instead of an optical position sensor shown in FIGS. 8A and 8B.

As shown in FIG. 6B, the semicircular shield plate 29 is fixed by the screw 30 on the upper surface of the protrusion 27a of the upper flange 27 of the guide pole GP1(2). More in detail, the semicircular shield plate 29 is adjusted to be located on a position corresponding to the moment a beam of light from the light emitting element 41 is received by the light receiving element 42 as shown in FIG. 8B when the guide surface (the upper surface of the lower flange 23 or the lower surface of the upper flange 27 of the guide pole GP1(2) is positioned at a predetermined reference height for attaining high compatibility of the magnetic recording and reproducing apparatus in recording and reproduction operation. Here, FIG. 8B illustrates the reference position where the shield plate 29 enters into the photointerpreter 31 in its deepest state.

The guide surface of the guide pole GP1(2) is detected by a signal generated by the reference position sensor 7(10) and the number of pulses generated by the rotary encoder 8(11). In detail, a reference rotational phase of the shield plate 29 is decided as its position corresponding to the moment a beam of light from the light emitting element 41 is received by the light receiving element 42. And, the reference position of the guide surface of the guide pole GP1(2) is decided as a height of the guide pole GP1(2) when the shield plate 29 is located at the reference rotational phase. Then, the positional deviation of the guide surface of the guide pole GP1(2) from the reference position in a vertical direction, or difference in height, is obtained by the reference position and an accumulated number of pulses from the rotary encoder 8(11). The accumulated number of pulses is given by an up-down counter with addition in upward deviation and subtraction in downward deviation of the guide pole GP1(2).

The guide pole GP1(2) is movable in a vertical direction by rotation of the gear 23g engaged with the gear 39. And, hence it is sometimes moved upwards or downwards by an external force even though the gear 23g is not engaged with the gear 39. And, if the guide pole GP1(2) rotates one or more times after the guide pole GP1(2) has been adjusted so that the shield plate 29 is positioned at the reference rotational phase, the reference rotational phase will not correspond to the height of the guide surface of the guide pole GP1(2).

In order to avoid these disadvantages, the elastic ring 26 (or a spring) described with respect to FIGS. 6B and 6C is preferable for the guide pole GP1(2) not rotating even if an external force is applied thereto. Further, a stopper may be provided along the travel passage of the shield plate 29 for the guide pole GP1(2) not rotating more than one time. Moreover, a slot may be formed on the shield plate 29 for fixing the shield plate 29 by a thread after it is adjusted at the reference rotational phase.

As described above, in completion of magnetic tape loading operation, the guide surfaces of the first and second guide poles GP1 and GP2 are adjusted to a predetermined height for recording and reproduction. And, in reproduction, the guide surfaces are further adjusted by the height adjustment mechanisms with height control signals generated by means of the curve data indicative of tracks close to the first and second guide poles GP1 and GP2 obtained based on the reproduced signal from the magnetic tape to make the tracks thereon meet the rotary tracks on the rotary drums to attain preferable reproduction.

In this respect, tracks on the magnetic tape are mostly curved like a character of "U" or "S". In case of the character "S"-shaped curve, the heights of the guide surfaces of the first and second guide poles GP1 and GP2 will be adjusted in opposite directions, that is, one is higher and the other lower, to cancel effects of the curved tracks on a reproduced signal by the height control mechanism with the control signal obtained based on the curve data as already described.

The envelope of a reproduced frequency-modulated signal from the magnetic tape will be wave-like corresponding to the character "S"-shaped curve of the tracks. After amplitude demodulation of the reproduced frequency-modulated signal, sampling is made for the envelope signal corresponding to sequential tracks reproduced by the amplitude demodulation to extract a head envelope signal portion, a middle envelope signal portion and an end envelope signal portion.

Based on the head and middle envelope signal portions, the controller 6 generates a first height control signal which indicates a magnitude and a direction for adjusting the height of the lower flange 23 of the first guide pole GP1 provided at the supply reel side.

Further, based on the end and middle envelope signal portions, the controller 6 generates a second height control signal which indicates a magnitude and a direction for adjusting the height of the lower flange 23 of the second guide pole GP2 provided at the take-up reel side.

The first and second height control signals are supplied to the control motors 9 and 12 of the height control mechanisms for the first and second guide poles GP1 and GP2, respectively.

An amplitude of the middle envelope signal portion will not change largely even though heights of the first and second guide poles GP1 and GP2 are adjusted. Height adjustment data is obtained by comparing sequential sampling values on the same position of the envelope signal corresponding to the reproduced frequency-modulated signal from the magnetic tape. The control motors 9 and 12 will be rotated by the number of rotation according the first and second height control signals, respectively, in a normal direction or a reverse direction by drive signals corresponding to the first and second height control signals.

The control motors 9 and 12 will send force to the primary gear 39 via the gear 35 fixed at the rotary shaft 32 and the gears 36 and 37. The force will further be sent to the secondary gear 23g engaged with the primary gear 39 that will be rotated in the normal direction or a reverse direction. The guide poles GP1 and GP2 will then be moved along the center line of the shaft 22, and thus the lower flange 23 of the shaft 22 will be moved vertically.

In the magnetic recording and reproducing apparatus shown in FIG. 5, the guide poles GP1 and GP2 are provided on the pole bases PB1 and PB2, respectively, so that they are slidable vertically with the aid of the elastic ring 26 within a range of predetermined upper and lower portions with respect to the predetermined reference height for attaining high compatibility of the magnetic recording and reproducing apparatus in recording and reproduction operation.

Positioning of the pole bases PB1 and PB2 is made by engagement with the base catchers BC1 and BC2, respectively. More in detail, the positioning is made in a horizontal direction by engagement of a concave (V cut) 43 with a portion 44 shown in FIG. 5, and in a vertical direction by engagement of a protrusion 45 with a positioning portion (not shown) provided on each of the pole bases PB1 and PB2.

The guide poles GP1 and GP2 are provided on the pole bases PB1 and PB2, respectively, as described above. The height of the guide surface of each guide pole is adjusted to a height decided by the height control mechanism at the fixed section side and the pole base side by engagement of each pole base and base catcher and of the other elements of the height control mechanisms.

Figures 9A, 9B:
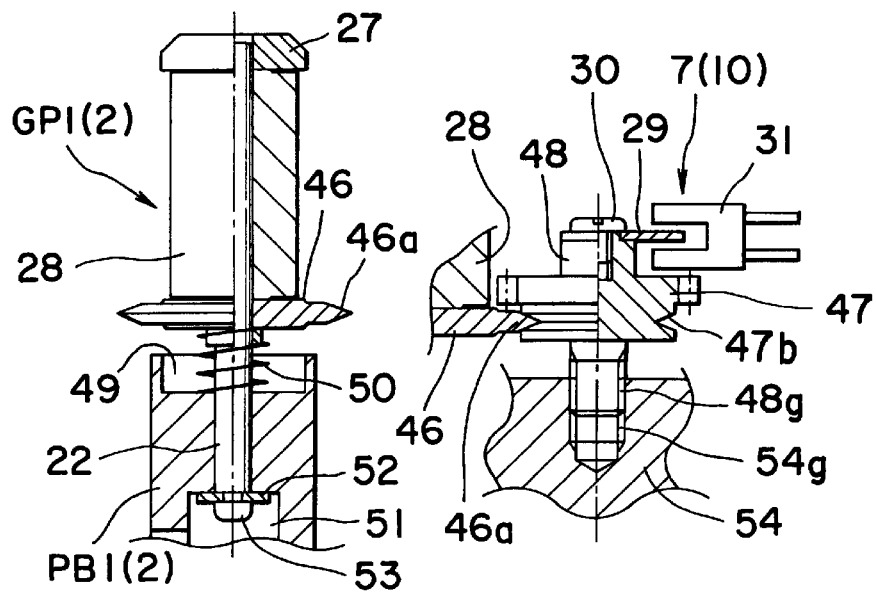
FIGS. 9A and 9B are illustrations of a guide pole provided on a pole base.

In FIGS. 9A and 9B, an engaging portion 46a is formed at a lower flange 46 of the shaft 22 of the guide pole GP1(2). The engaging portion 46a is engageable with an engaging slot 47b formed at the boss of a gear 47 of the fixed-side height control mechanism.

Further, a concave 49 is formed at the upper portion of the pole base DB1(2). A spring 50 is wound around the guide pole shaft 22 between the lower surface of the lower flange 46 and the concave 49. The spring 50 always pushes up the lower and upper flanges 46 and 27, and the roller 28 provided therebetween.

A washer 52 is fixed at the lower end of the shaft 22 by a thread 53 in a cavity 51 as protruding from the lower end of the shaft 22. This restricts the upper deviation of the guide pole GP1(2). A thread 48g is formed around the outer surface of the lower portion of a shaft 48 of the gear 47. The thread 48g is engaged with a thread 54g formed at a protrusion 54 of the drum base DB.

FIG. 5 shows an intermediate state of loading operation. When the loading operation is completed from the intermediate state, the engaging portion 46a of FIG. 9A formed at a head of the lower flange 46 is engaged with the engaging slot 47b formed at the boss of the gear 47.

The lower flange 46 is one of the parts constituting the height adjustment mechanism at the pole base-side. On the other hand, the gear 47 is one of the parts constituting the fixed-side height control mechanism.

The engaging portion 46a formed at the head of the lower flange 46 is character "V"-shape like at its cross section as shown in FIG. 9B. The engaging slot 47b formed at the boss of the gear 47 is also character "V"-shape like at its cross section so as to engage with the engaging portion 46a until the completion of loading operation.

On the completion of loading operation in FIG. 5, recording or reproducing operation starts and the controller 6 supplies the height control signal to the control motor 9(12). The motor 9(12) rotates the gear 47 via the gears 35, 36 and 37 of the power transfer system. The rotation of the gear 47 causes rotation of the thread 48g while being engaged with the thread 54g. This forces the shaft 48 of the gear 47 to be moved in a vertical direction according to its rotational direction.

While the shaft 48 of the gear 47 is rotating, the shield plate 29 of the reference position sensor 7(10) is also rotated to let the photointerpreter 24 of the reference position sensor 7 output a positional signal. Further, the shaft 48 is rotating and moving in a vertical direction, the engaging portion 46a being engaged with the engaging slot 46b will also be moved in the vertical direction. The guide pole GB1(2) will thus be moved in the vertical direction in response to the rotation of the control motor 9(12).

How the reference heights of the guide poles GP1 and GP2 are set when manufacturing the magnetic recording and reproducing apparatus shown in FIGS. 3, 4 and 5 will be described with reference to FIGS. 10A to 10C.

Figures 10A, 10B, 10C:
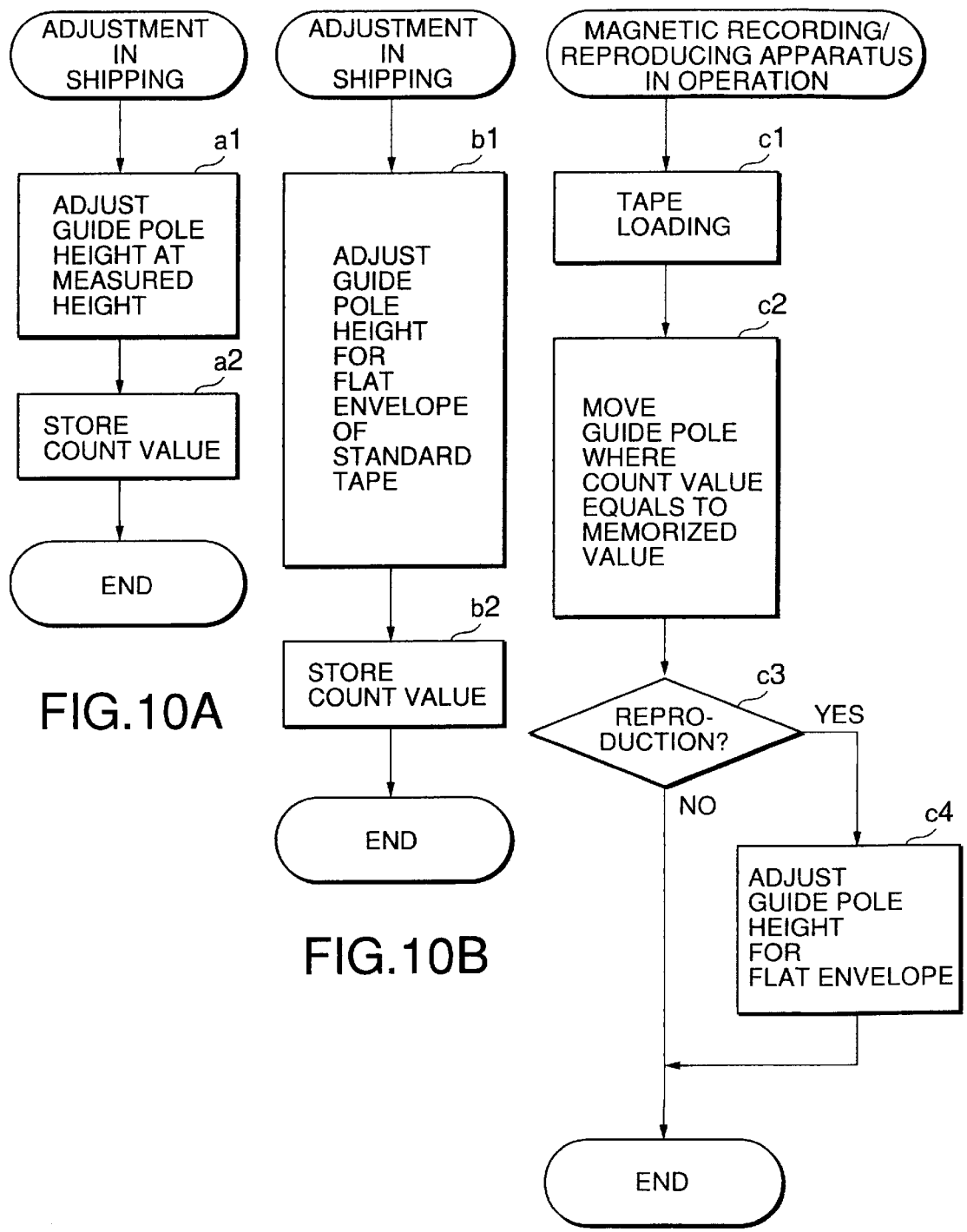
FIGS. 10A to 10C are flow charts for explaining operations of the magnetic recording and reproducing apparatus according to the present invention.

In a flow chart shown in FIG. 10A for height adjustment in shipment (manufacture), first, in step a1, the control motor 9(12) is driven to move the guide pole GP1(2) in a vertical direction to adjust its guide surface at a predetermined height by a measuring instrument. Here, the guide surface is the upper surface of the lower flange, the lower surface of the upper flange or roller surface. The predetermined height is a reference height predetermined for attaining high compatibility of the magnetic recording and reproducing apparatus in recording and reproducing operations. Next, in step a2, a count value of the counter is stored in an external non-volatile memory 16 of FIG. 1.

In another flow chart shown in FIG. 10B for height adjustment in shipment (manufacture), first, in step b1, the control motor 9(12) is driven to obtain a flat envelope of a frequency-modulated signal reproduced from a reference tape to move the guide pole GP1(2) in a vertical direction to adjust its guide surface at a predetermined height.

In detail, the reference tape with no curved portion on the tracks is loaded into the recording and reproducing apparatus in step b1.

The control motor 9 of the first height control mechanism for the guide pole GP1 at supply reel side is being rotated in a normal or reverse direction until the reference positional sensor 7 outputs a reference positional signal corresponding to the reference rotational phase of the shield plate 29 while the counter (not shown) of the controller 6 counts the number of pulses output by the rotary encoder 8. The number of pulses indicates a period of time until the reference positional signal is output. The counter is then preset at a predetermined number, for example, zero when the reference positional signal is output.

Next, the control motor 12 of the second height control mechanism for the guide pole GP2 at take-up reel side is being rotated in a normal or reverse direction until the reference positional sensor 10 outputs a reference positional signal corresponding to the reference rotational phase of the shield plate 29 while another counter (not shown) of the controller 6 counts the number of pulses output by the rotary encoder 11. The counter is then preset at a predetermined number, for example, zero when the reference positional signal is output.

Then, the reference tape is travelling to detect a reproduced frequency-modulated signal by the envelope detector 5 under the stable travelling state. The detector 5 applies sampling to each envelope signal of the reproduced frequency-modulated signal and corresponding to a track on the reference tape to extract a head envelope signal portion, a middle signal portion and an end signal portion. The extracted signal portions are converted into digital signals and supplied to the controller 6.

The controller 6 adjusts the height of the first guide pole GP1 at the supply reel-side within an adjustable range by the control motor 9 and detects envelope signals. The controller 6 further calculates magnitude (envelope values) of the envelope signals which are changing in accordance with change in height of the guide pole GP1 (change in values counted by the counter). The calculated values are stored in a memory (not shown) of the controller 6.

The controller 6 reads the envelope values from the memory that have been obtained within the adjustable range and compares them with each other to find a first count value corresponding to the envelope value that indicates the most flat tracks on the reference tape. The first count value for the guide pole GP1 is stored in the external non-volatile memory 16.

Next, the controller 6 adjusts the height of the second guide pole GP2 at the take-up reel-side within an adjustable range by the control motor 12 and detects envelope signals. The controller 6 further calculates magnitude (envelope values) of the envelope signals which are changing in accordance with change in height of the guide pole GP2 (change in values counted by the counter). The calculated values are stored in the memory (not shown) of the controller 6.

The controller 6 reads the envelope values from the memory that have been obtained within the adjustable range and compares them with each other to find a second count value corresponding to the envelope value that indicates the most flat tracks on the reference tape. The second count value for the guide pole GP2 is stored in the external non-volatile memory 16.

The first and second count values stored in the memory 16 as the reference height data of the first and second guide poles GP1 and GP2, respectively, correspond to the standard heights of the guide poles GP1 and GP2. The standard heights are predetermined for attaining high compatibility of the magnetic recording and reproducing apparatus in recording and reproducing operation.

Therefore, adjusting heights of the first and second guide poles GP1 and GP2 so as to correspond to the first and second count values makes the heights of the guide poles GP1 and GP2 adjusted to the standard heights.

Next, with reference to FIG. 10C, guide pole-height adjustment in recording and reproduction of a magnetic tape by the magnetic recording apparatus according to the present invention and also in reproduction by the magnetic recording apparatus according to the present invention of another magnetic tape recorded with data by another magnetic recording apparatus will be described.

First, in recording and reproduction of a magnetic tape by the magnetic recording apparatus according to the present invention, in step c1 of FIG. 10C, a magnetic tape is loaded into the magnetic recording apparatus according to the present invention.

Next, in step c2, the control motor 9 of the first height adjustment mechanism for the guide pole GP1 at the supply reel side is rotated in a normal or reverse direction until the number of pulses generated by the rotary encoder 8 counted by the counter becomes equal to a count value stored in the external non-volatile memory 16. The control motor 9 is stopped when the number of pulses become equal to the stored value.

Further, in step c2, the control motor 12 of the second height adjustment mechanism for the guide pole GP2 at the take-up reel side is rotated in a normal or reverse direction until the number of pulses generated by the rotary encoder 11 counted by the counter becomes equal to another count value stored in the external non-volatile memory 16. The control motor 12 is stopped when the number of pulses become equal to the stored values.

The process in step c2 adjusts the guide surfaces of the guide poles GP1 and GP2 so as to correspond to the standard guide pole heights. Then, in completion of step c2, the heights of the guide poles GP1 and GP2 become the standard heights.

Next, in step c3, judgement is made as to whether an operation mode is reproduction or not. If not, or the mode is recording, the process ends.

On the other hand, if the mode is reproduction, the process goes to step c4. A frequency-modulated signal is reproduced from the magnetic tape. And, envelope signals are detected by the envelope detector 5. Then, sampling is made to each envelope signal to extract a head envelope signal portion, a middle envelope signal portion and an end envelope signal portion. The extracted signal portions are converted into digital signals and supplied to the controller 6 as curve data. The controller 6 drives the control motors 9 and 12 in the normal or reverse direction according to the curve data to adjust the heights of the guide poles GP1 and GP2 to compensate for curved tracks on the magnetic tape. Then, the process ends.

Further, in reproduction by the magnetic recording and reproducing apparatus according to the present invention of another magnetic tape recorded with data by another magnetic recording apparatus will be described.

Through steps c1 and c2 the same as those described above, the guide poles GP1 and GP2 are adjusted to the standard heights. Thus, when a magnetic tape recorded by another magnetic recording and reproducing apparatus is recorded by the magnetic recording and reproducing apparatus according to the present invention with the adjusted guide poles, this magnetic tape can be preferably reproduced by another magnetic recording and reproducing apparatus.

Next, in step c3, a magnetic tape recorded by another magnetic recording and reproducing apparatus is reproduced. Further, in step c4 the same as that described above, the controller 6 drives the control motors 9 and 12 in normal and reverse directions according to curve data to adjust the heights of the guide poles GP1 and GP2 to compensate for the curved tracks on the magnetic tape.

Therefore, even if the recorded magnetic tape has curved tracks, a stable signal can be reproduced the same as reproduction from a magnetic tape with straight tracks.

The shield plate 29 of the reference position sensor 7 (10) has the positional relationship with the light emitting and receiving elements of the photointerpreter 31 when the guide surface of the guide pole GP1 (GP2) is adjusted to the standard height as described above with reference to FIGS. 8A and 8B.

However, the shield plate 29 is provided such that it will be moved in the loading operation, while the photointerpreter 31 is provided at the fixed section. This sometimes causes deviation of the rotational locus of the photointerpreter 31 from the reference rotational locus due to vibration, collision, etc.

In order to avoid this, the control motor 9 (12) may be rotated in the normal or reverse direction on completion of the loading operation to move the guide pole GP1 (GP2) vertically within a predetermined range so that the reference position of the guide pole GP1 (GP2) corresponds to the count value of the counter.

As described above, in the magnetic recording and reproducing apparatus shown in FIGS. 3, 4 and 5, the reference position sensors 7 and 10 provided at the first and second height adjustment mechanisms provided at the supply and take-up reel sides, respectively, generate reference position signals that are supplied to the controller 6. Further, the rotary encoders 8 and 11 generate pulses carrying data of rotational direction and amount that are also supplied to the controller 6. Moreover, the envelope detector 5 generates envelope signals in response to frequency-modulated signal reproduced from the magnetic tape and supplies the envelope signals to the controller 6.

The controller 6 then generates height control signals on the height of the guide poles GP1 and GP2 to drive the control motors 9 and 12 of the first and second height adjustment mechanisms, respectively, to adjust the heights of the guide poles GP1 and GP2.

Here, the first (second) height adjustment mechanism is of the closed-loop automatic height control system and includes the control motor 9(12), reference position sensor 7(10), rotary encoder 8(11), control motor 9(12), gears 23g, 35 to 37 and 39 in FIGS. 3 and 4 or gears 35 to 37 and 47 in FIG. 5, guide pole GP1(GP2) and controller 6.

When the guide pole GP1(GP2) is adjusted to the reference height, it is indicated by a count value of the up-down counter that counts the number of pulses generated by the rotary encoder 8(11). On the other hand, the count value, that is, the reference height is prestored in the external non-volatile memory 16. Thus, the deviation of the height of the guide pole GP1(GP2) from the reference height can be detected as a difference between the count value of the up-down counter and the count value prestored in the external non-volatile memory 16.

Therefore, according to the magnetic recording and reproducing apparatus shown in FIGS. 3, 4 and 5, by means of the count values of the counter, the guide surfaces of the guide poles GP1 and GP2 can be adjusted to their reference heights by the automatic height control system and also can be accurately varied.

Figure 11A:
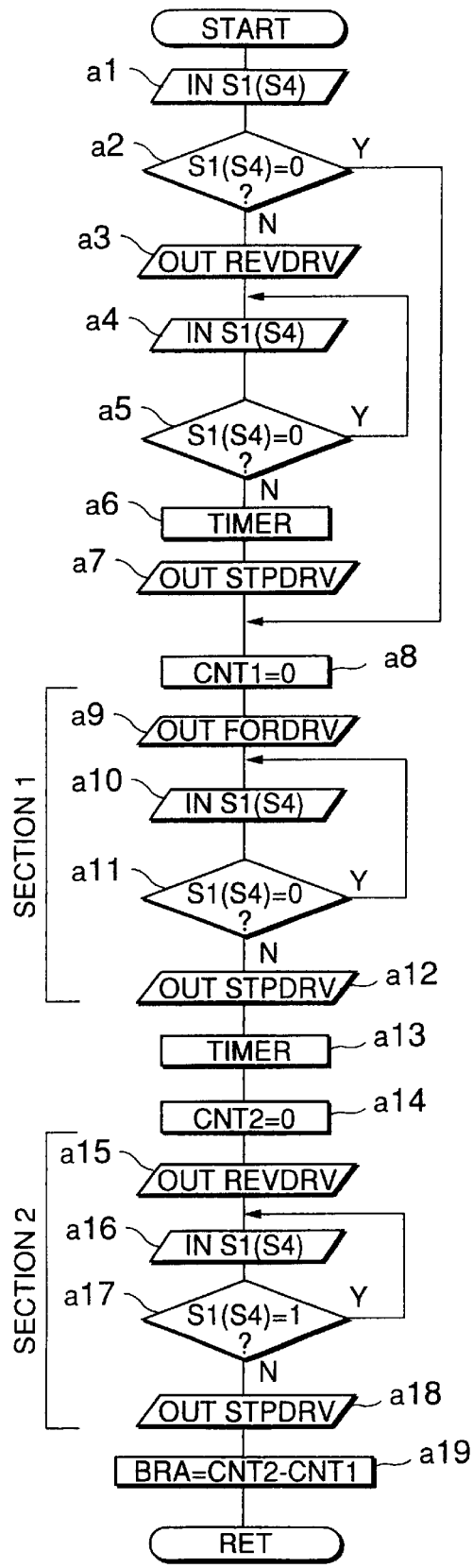
FIGS. 11A to 11C are flow charts for explaining other operations of the magnetic recording and reproducing apparatus according to the present invention.
Figure 11B:
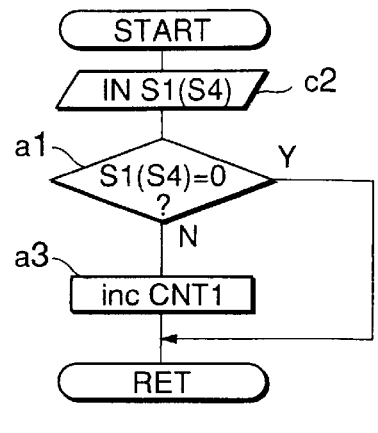
Figure 11C:
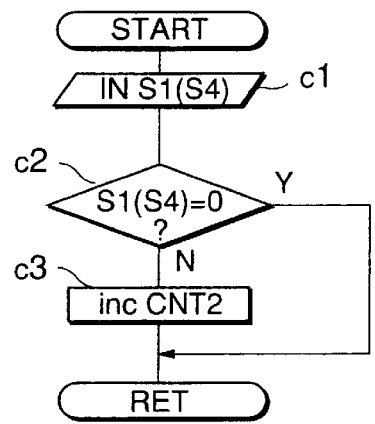

FIGS. 11A to 11C are respectively flow charts of assistance in explaining the operation of measuring the backlash amount of the gear of the power transfer system. FIG. 11B is a flowchart for an interruption processing executed in the section 1 in FIG. 11A. FIG. 11C is a flowchart for another interruption processing executed in the section 2 in FIG. 11A.

At "START" in the flowchart shown in FIG. 11A, the controller 6 first reads a reference position signal S1(S4) output from the reference position sensor 7(10) in "in S1(S4)" of step a1 and proceeds to "S1(S4)=0" of step a2. In step a2, judgement is made whether the reference position signal S1(S4) read in step a1 is "0" or "1".

The state that the reference position signal S1(S4) is "0" indicates that a shield plate 29 of the reference position sensor 7(10) is present in the optical path between the light emitting element 41 and the light receiving element 42 as shown in FIG. 8B provided in a photointerpreter 31 of the reference position sensor 7(10).

On the other hand, the state that the reference position signal S1(S4) is "1" indicates that the shield plate 29 is present outside the optical path between the light emitting element 41 and the light receiving element 42.

In step a2, when judgement is made that the reference position signal S1(S4) is "0", the process proceeds to "CNT=0" of step a8 to start the operation of measuring the backlash amount of the gear of the power transfer system performed in the succeeding steps after step a8. On the other hand, in step a2, when judgement is made that the reference position signal S1(S4) is "1", this indicates the state that a rotational phase of the shield plate 29 of the reference position sensor 7(10) is inconvenient for measuring the backlash amount of the gear of the power transmission portion. Therefore, the process proceeds to "Out REVDRV" of step a3, where a control motor 9(12) is reversed, and the procedure proceeds to "in S1(S4)" of step a4.

In step a4, the reference position signal S1(S4) output from the reference position sensor 7(10) is read, and the procedure proceeds to step a5. In step a5, judgement is made whether the reference position signal S1(S4) read in step a4 is "0" or "1". When the reference position signal is "1", the procedure returns to step a4. Then, the operation of step a4 and the operation of step a5 are repeated till the result of judgement that the reference position signal read in step a4 is "1" is obtained by the judgement in step a5.

In step a5, when the judgement is made that the reference position signal S1(S4) is "0", the procedure proceeds to "TIMER" of step a6, where the time is caused to pass for a while by the timer. Then, the procedure proceeds to "OUT STPDRV" of step a7, where the control motor 9(12) is stopped. The procedure proceeds to "CNT1=0"in step a8 to start the operation of measuring the backlash amount of the gear of the power transmission portion performed in the succeeding steps after step a8.

In "CNT=0" of step a8, a count value of a counter provided in the controller 6 is set to 0, then the procedure proceeds to "OUT FORDRV" of step a9. In step a9, the control motor 9(12) is normally driven. The state of the time t0 in the time chart shown in FIG. 12 indicates the time at which the time has passed for a while after the control motor 9(12) has started its normal rotation. In the section 1 from step a8 to step a12, the interruption processing is carried out by a pulse S2(S5) generated from the rotary encoder 8(11). The content of the interruption processing is shown in FIG. 11B.

In "in S1(S4)" of step b1 in FIG. 11B, the reference position signal S1(S4) is read. In "S4=0" of step b2, judgement is made whether the reference position signal S4 read in step b1 is "0" or "1". In "inc CNT1" of step b3, a count value of a counter 1 (not shown) provided in the controller 6 is incremented by "1".

That is, when the interruption is effected by the pulse S2(S5) generated from the rotary encoder 8(11) in the section 1, the reference position signal S1(S4) is read in step b1. The procedure proceeds to Step (b2), where judgement is made whether the reference position signal S1(S4) read in step b1 is "0" or "1". In case of S1(S4)=0, the procedure returns, and in case of S1(S4)=1, the procedure proceeds to step b3, where a count value of the counter 1 is incremented by "1", and the procedure returns.

In the operation of measuring the backlash amount of the gear of the power transfer system started in step a8, the shield plate 29 of the reference position sensor 7(10) in a period of starting the operation of measurement (time t0 to t1 in FIG. 12) is present in the optical path between the light emitting element 41 and the light receiving element 42 provided in the photointerpreter 31 of the reference position sensor 7(10). So, the reference position signal S1(S4) generated from the reference position sensor 7(10) during the aforesaid period is in the state of "0" as in the period of the time t0 to t1 in FIG. 12.

Figure 12:
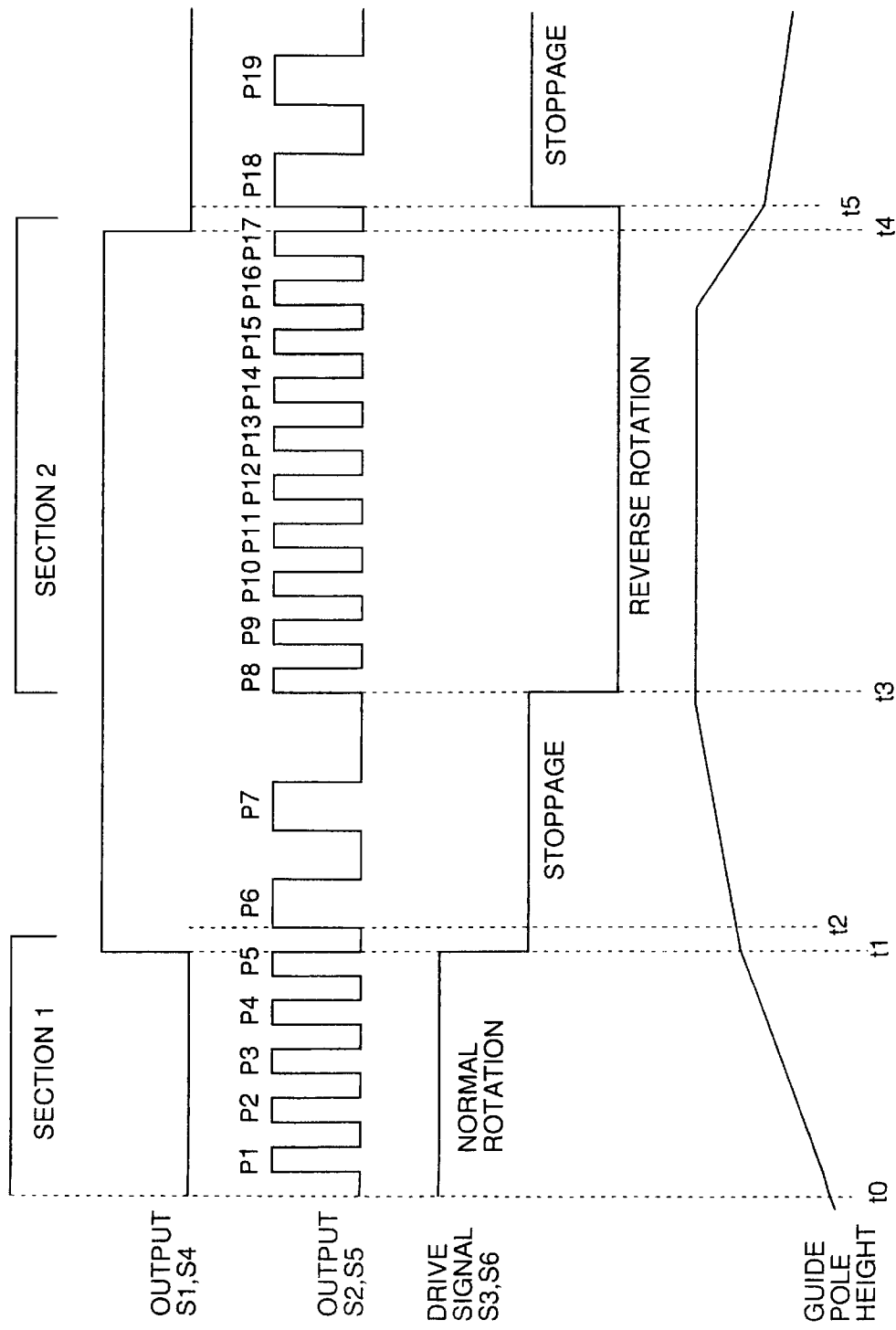
FIG. 12 is a timing chart for explaining the operations of the magnetic recording and reproducing apparatus according to the present invention.

Therefore, P1 to P5 in the pulse S2(S5) generated from the rotary encoder 8(11) during the period of the aforesaid time t0 to t1 in FIG. 12 are not counted by the counter 1 but the guide pole GP1(GP2) keeps displacing upward during the aforesaid period (see S3(S6) in FIG. 12).

When judgement is made that at the time t1 in FIG. 12, the reference position signal S1(S4) generated from the reference position sensor 7(10) has been changed to "1" in step b2 in the interruption processing, the counting operation of the counter 1 is started in step b3 in the interruption processing.

In the main routine shown in FIG. 11A, the control motor 9(12) is stopped in "OUT STDRV" of step a12. In "in S1(S4)" of step a10 in the main routine shown in FIG. 12A, the reference position signal S1(S4) is read. In "S1(S4)=0"of step a11, judgement is made whether the reference position signal S1(S4) read in step a11 is "0" or "1".

In "TIMER" of step a13, the time is awaited till the control motor 9(12) assumes the completely stopped state, and the procedure proceeds to "CNT2=0" of step a14. In "CNT2=0" of step a14, a count value of a counter 2 (not shown) provided in the controller 6 is set to 0, and the procedure proceeds to "OUT REVDRV" of step a15. In step a15, the control motor 9(12) is reversed by a motor drive signal S3(S6).

In the section 2 from step (a14) to step (a18), the interruption processing is carried out by the pulse S2(S5) generated from the rotary encoder 8(11). The content of the interruption processing is shown in FIG. 11C.

In "in S1(S4)" of step c1 in FIG. 11C, the reference position signal S1(S4) is read. In "S1(S4)=0" of step c2, judgement is made whether the reference position signal S1(S4) read in step c1 is "0" or "1". In "inc CNT2" of step c3, a count value of a counter c (not shown) provided in the controller 6 is made increment by "1".

That is, when the interruption is effected by the pulse S2(S5) generated from the rotary encoder 8(11) in the section 2, the reference position signal S1(S4) is read in step c1. The procedure proceeds to step c2, where judgement is made whether the reference position signal S1(S4) read in step c1 is "0" or "1". In case of S1(S4)=0, the procedure returns, and in case of S1(S4)=1, the procedure proceeds to step c3, where a count value of the counter 1 is incremented by "1", and the procedure returns.

The shield plate 29 of the reference position sensor PS in the starting period (the time t2 to t3 in FIG. 12) in the section 2 is in the state outside the optical path between the light emitting element 41 and the light receiving element 42 provided in the photointerpreter 31 of the reference position sensor 7(10). So, the reference position signal S1(S4) generated from the reference position sensor 7(10) during the aforesaid period is in the state of "1" as shown in FIG. 12. So, P6 to P17 in the pulse S2(S5) generated from the rotary encoder 8 (11) in FIG. 1 are counted by the counter 2.

In the period of the time t3 to t4 in FIG. 12, the drive motor 9(12) is rotated but there is a period that a turning force is not transmitted to the guide pole GP1(GP2) due to the presence of the backlash in the gear of the power transfer system. In that period, no change occurs in height of the guide pole GP1(GP2). However, a point in time of termination of the period that the turning force is not transmitted due to the presence of the backlash cannot be detected.

At the time t4 in FIG. 12, the shield plate 29 of the reference position sensor 7(10) enters the optical path between the light emitting element 41 and the light receiving element 42 provided in the photointerpreter 31 of the reference position sensor 7(10) so that the reference position signal S1(S4) is changed from the state of "1" to that of "0".

At the time of t4, the interruption routine in the section 2 shown in FIG. 11C interrupts the counting operation of the counter 2. Thereby, pulses P18, P19 . . . after the time t5 out of the pulse S2(S5) generated from the rotary encoder 8(11) are not counted by the counter 2.

Further, in the main routine shown in FIG. 11A, the control motor 9(12) is stopped by "OUT STDRV"of step a18. In "in S1(S4)" of step a16 in the main routine shown in FIG. 11A, the reference position signal S1(S4) is read. In "S1(S4)=0" of step (a17), judgement is made whether the reference position signal S1(S4) read in step a11 is "0" or "1".

In "BRA=CNT2−CNT1" of step a19, the count value of the counter 2 is subtracted from the count value of the counter 1 to obtain the result of measurement of the backlash amount of the gear of the power transfer system.

Next, the result of measurement of the backlash amount of the gear of the power transfer system obtained by step (a19) will be explained hereinafter by way of a time chart shown in FIG. 12. In the example shown in FIG. 12, the number of pulses S2(S5) generated from the rotary encoder 8(11) is 2, i.e. a pulse P6 and a pulse P7, and the count value of the counter 1 is 2 in a period from a point in time t1 at which the reference position signal S1(S4) generated from the reference position sensor 7(10) is changed from "0" to "1" to a point in time t3 at which the control motor 9(12) is reversed from the normal rotation via stoppage.

The number of pulses S2(S5) generated from the rotary encoder 8(11) is 10 from a pulse P8 a pulse P17, and the count value of the counter 2 is 10 in a period from a point in time t3 at which the control motor 9(12) to a point in time t4 at which the reference position signal S1(S4) generated from the reference position sensor 7(10) is changed from "1" to "0".

The count value 2 of the counter 1 corresponds to the height position of the guide pole GP1(GP2) excessively higher than a reference position.

Thus, the backlash amount of the gear of the power transfer system is obtained as an eight-pulse portion obtained by subtracting the count value 2 of the counter 1 from the count value 10 of the counter 2 which counted the pulses S2(S5) generated from the rotary encoder 8(11).

The backlash amount of the gear of the power transmission portion obtained as described above is stored in the external non-volatile memory 16, and the backlash amount stored therein is read prior to the recording and reproducing operation as described above. Then, the count value of the pulses S2(S5) generated from the rotary encoder 8(11) is corrected to correct an error in position caused by the backlash whereby the height position of the guide pole GP1(GP2) in the recording and reproducing operation can be set to a standard height (a regular height predetermined for securing a compatibility of the recording and reproducing operation).

An alternative mode of correction of the error in position of the backlash will be explained below. For example, in the state that the guide pole GP1(GP2) is displaced in the predetermined direction, the value counted by a counter of the controller 6 for the output pulse number of the rotary encoder 8(11) is used for locating the guide pole GP1(GP2). Further, in the state that the guide pole GP1(GP2) is displaced in the direction reversed to the aforementioned displaced direction, the rotational amount of the drive section, such as the control motor 9(12) is increased by an amount corresponding to a stored count value corresponding to the backlash in the power transfer system.

For example, the control motor 9(12) is rotated in the rotational amount corresponding to the numerical value of (A+B) obtained by adding, to a stored count value A corresponding to the backlash in the power transfer system, a numerical value B smaller than the count value A up to the target height position in the state that the guide pole GP1 (GP2) is displaced in the predetermined direction. Further, the control motor 9(12) is rotated in the rotational amount corresponding to the numerical value of (A−B).

Even if a supply of a drive signal to the control motor 9(12) is stopped at the time t2 after the passage of a little time from the time t1 at which the shield plate 29 of the reference position sensor 7(10) is changed to the state outside that in the optical path between the light emitting element 41 and the light receiving element 42 provided in the photointerpreter 31 of the reference position sensor 7(10) so that the reference position signal S1(S4) generated from the reference position sensor 7(10) is changed from the "0" state to the "1" state as shown in FIG. 12, pulses P6 and P7 are output from the rotary encoder 8(11), which are generated on the basis of the overrun of the control motor 9(12).

The number of output pulses S2(S5) output from the rotary encoder 8(11) in a period from the time at which the reference position signal S1(S4) generated from the reference position sensor 7(10) is changed from the "0" state to the "1" state as shown in FIG. 12 to the time at which the control motor 9(12) starts to run in the direction reversed to the prior rotational direction is generated on the basis of the overrun of the control motor 9(12).

Therefore, the count value of the number of the output pulses S2(S5) can be used as data for the overrun amount of the control motor 9(12). The overrun amount likewise occurs when the control motor 9(12) rotates in the direction reversed to the rotational direction previously mentioned, and therefore, the data of the overrun amount are measured individually for the normal rotation and reversed rotation of the control motor 9(12), which are stored in the external non-volatile memory 16.

At the time of the adjusting operation for setting the height position of the guide pole GP1(GP2) in the magnetic recording and reproducing apparatus to the standard height (the regular height predetermined for securing the compatibility of the recording and reproducing operation) or at the time of operation for controlling the height position of the guide pole GP1(GP2) at the time of recording and reproducing operation, the data of the overrun amount stored in the external non-volatile memory 16 are used so that when the actual height position of the guide pole GP1(GP2) is adjusted, the target height position is set with the number of pulses in which the number of output pulses S2(S2(S5)) output from the rotary encoder 8(11) is less than the number of pulses necessary for making the height position of the guide pole GP1(GP2) the target height position to be set actually by the number of pulses stored as the data of the overrun amount in the external non-volatile memory 16.

Figure 13A:
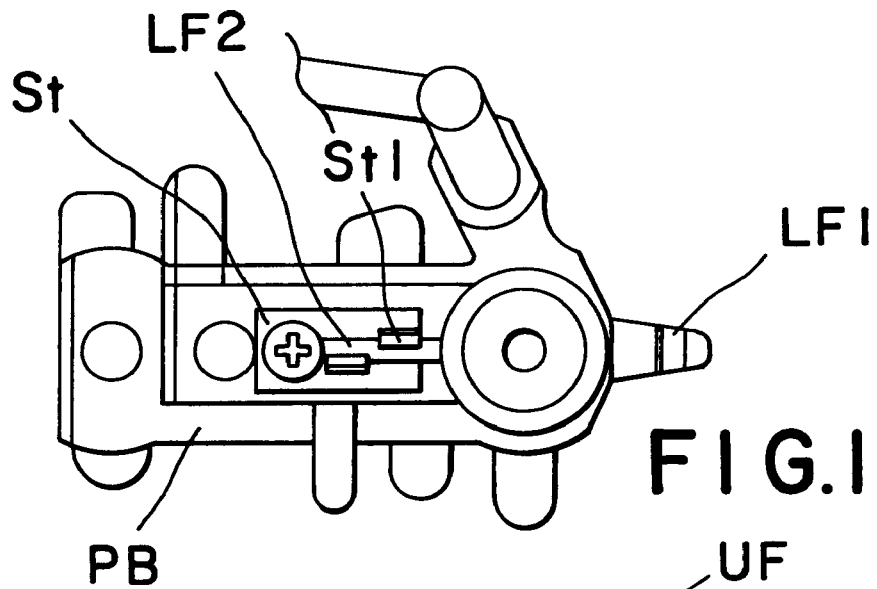
FIGS. 13A and 13B are a plan view and a sectional view, respectively, of a pole base.
Figure 13B:
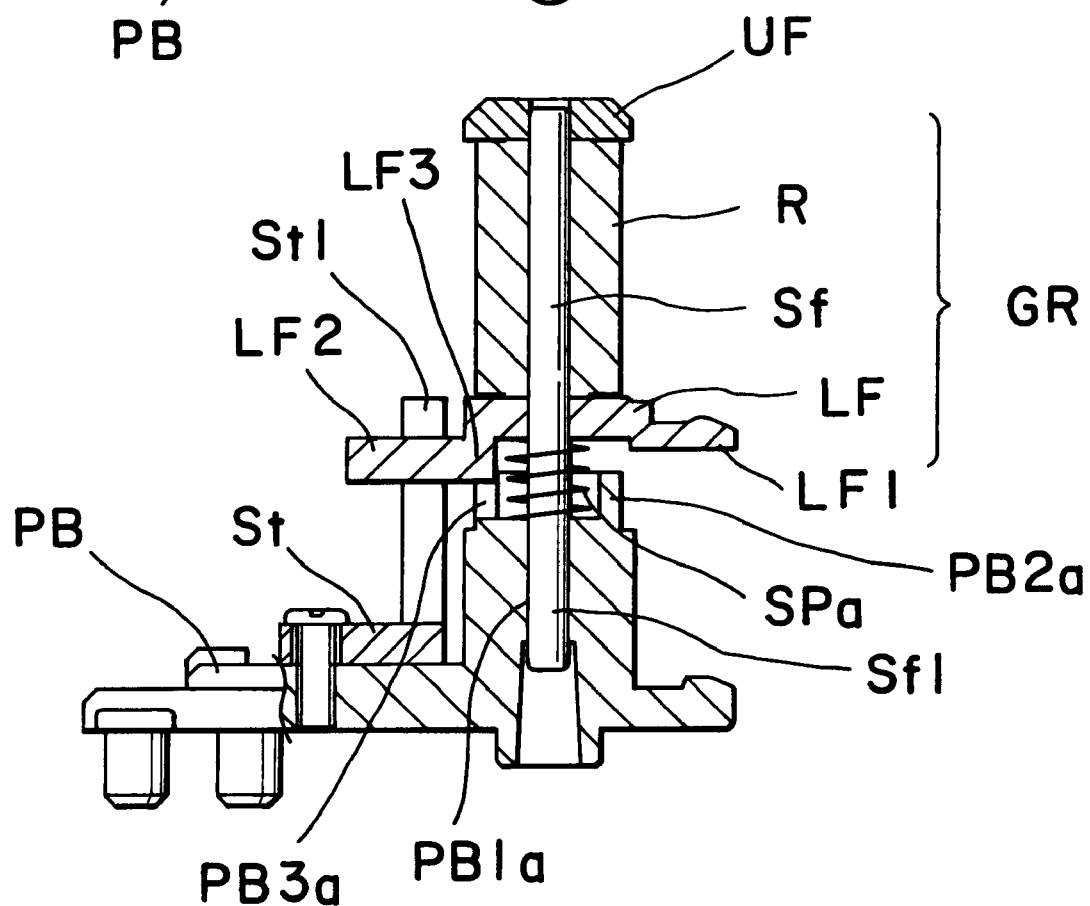

FIGS. 13A and 13B illustrate an embodiment of a pole base PB and a guide roller GR (guide pole) corresponding to the pole base PB1(PB2) and the guide pole GP1(GP2), respectively, shown in FIG. 5. The guide roller GR has an upper flange UF and a lower flange LF secured to a shaft Sf, between which is sandwiched a roller R rotatably. The lower flange LF has a lever LF1 directed in the progressing direction and a rear stop bar LF2.

The lower side Sf1 of the shaft Sf is smoothly fitted into a hole PB1a of the pole base PB to constitute a guide displaced smoothly in the height direction. A spring SPa is provided between the lower flange LF and the pole base PB to always push the roller guide GR upward. The stop bar LF2 of the lower flange LF is stopped by hooks St1 and St2 of a stopper St on the pole base PB, and the guide roller GR is maintained at a constant height HL. A root portion LF3 of the stop bar LF2 is fitted into a slit PB3a of a holding portion PB2a of the pole base PB to constitute a whirl-stop.

FIGS. 14A to 16C show the operating state of the pole base PB of FIGS. 13A and 13B. Through these figures, reference signs are assigned only to the elements directly related to the operating state of the pole base PB for brevity.

Figure 14C:
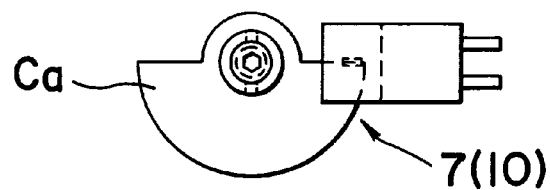
FIGS. 14A to 14C are illustrations for explaining movement of a pole base.
Figure 14B:
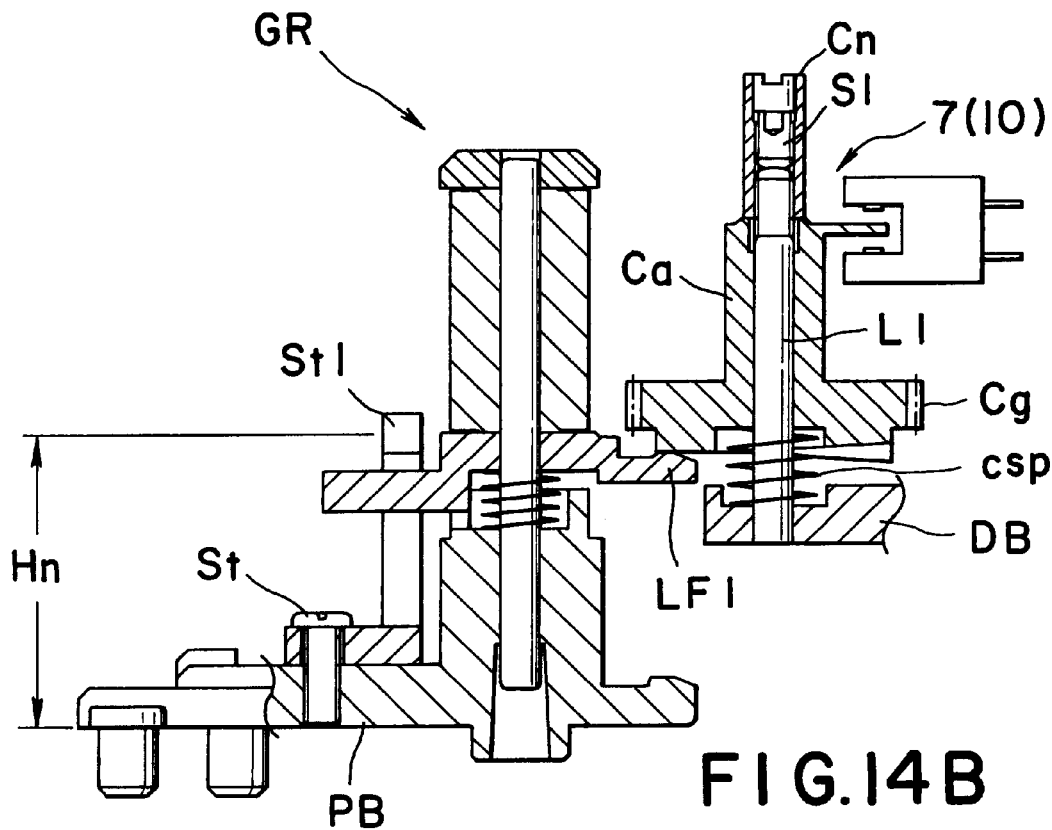
Figure 14A:
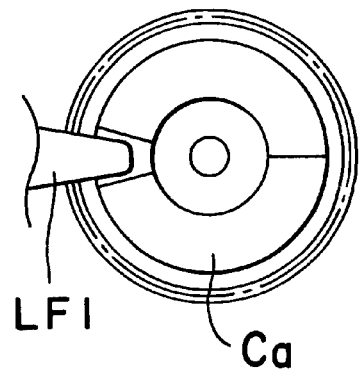

FIGS. 14A to 14C show the state of recording and normal reproduction after tape loading has been completed. The lever LF1 of the lower flange LF touches a flat surface of an adjusting cam Ca (detail of which will be described later), and the guide roller GR lowers than the height halfway of loading. This height is a normal height Hn that shows the state of recording and normal reproduction.

Figure 15C:
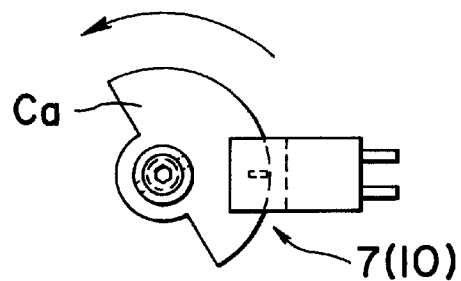
FIGS. 15A to 15C are other illustrations for explaining movement of a pole base.
Figure 15B:
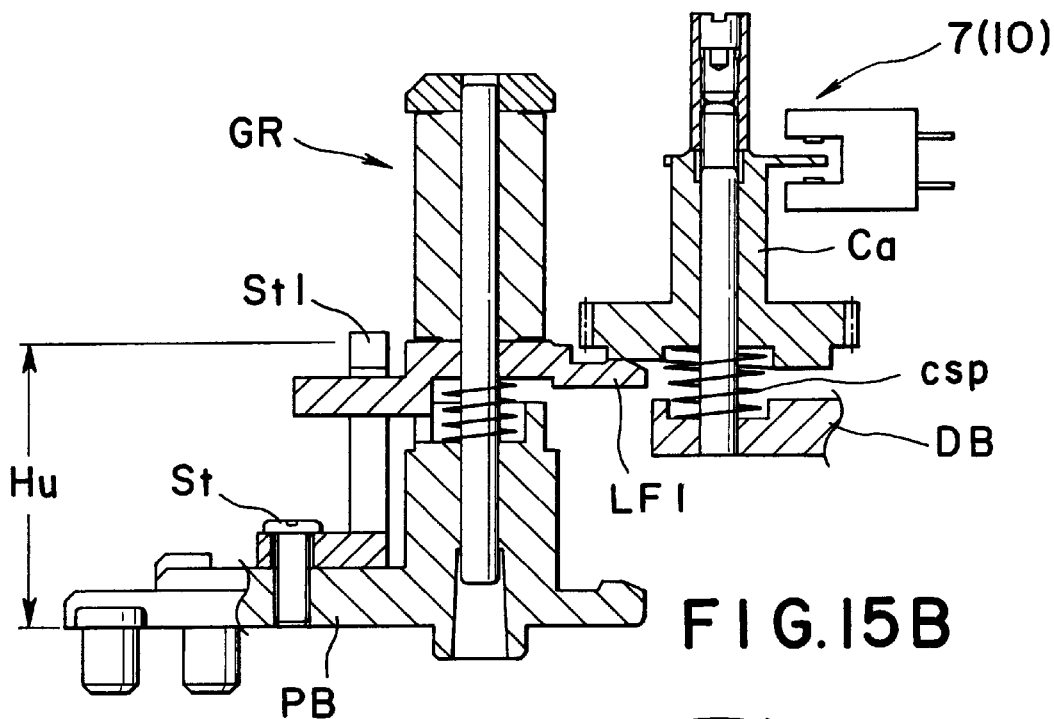
Figure 15A:
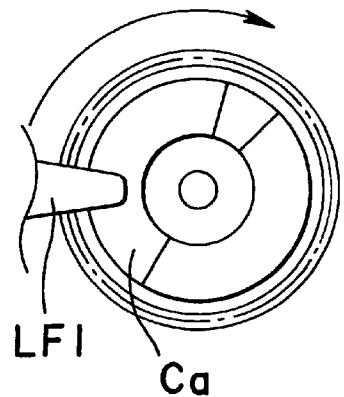

FIGS. 15A to 15C show the state when the guide roller GR is displaced upward. The adjusting cam Ca rotates in a counter clockwise direction, and the guide roller GR is displaced upward along the cam surface at an upper height Hu.

Figure 16C:
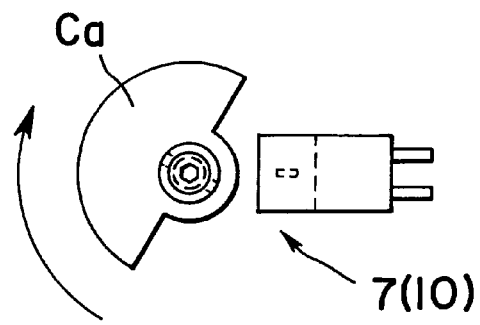
FIGS. 16A to 16C are still other illustrations for explaining movement of a pole base.
Figure 16B:
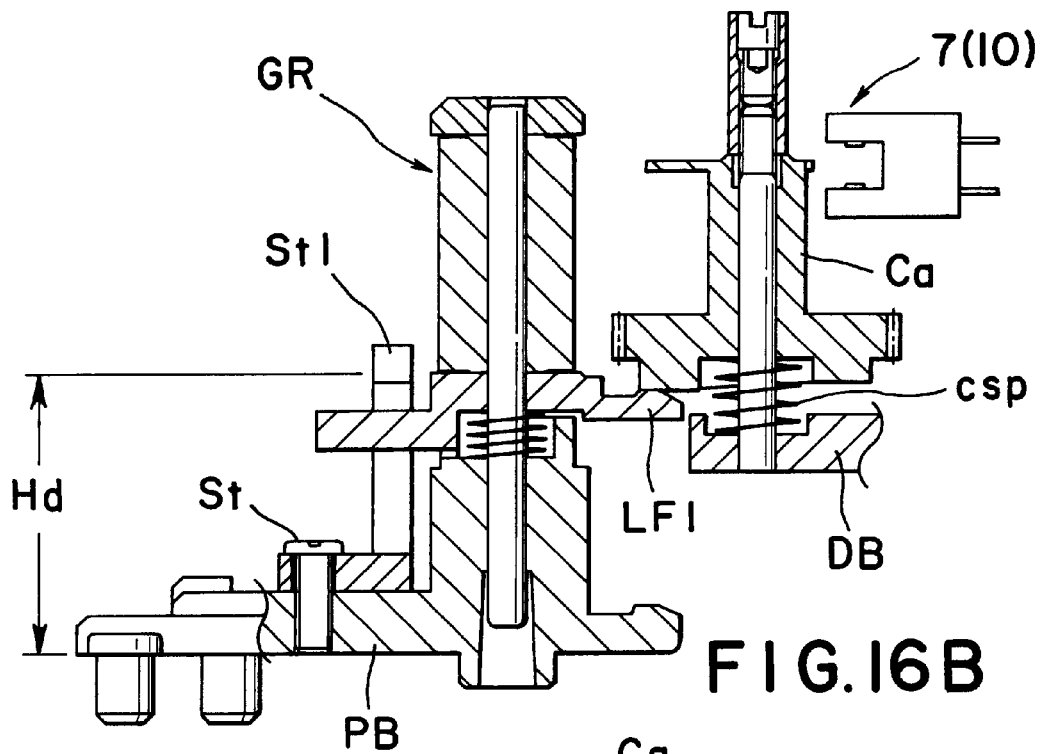
Figure 16A:
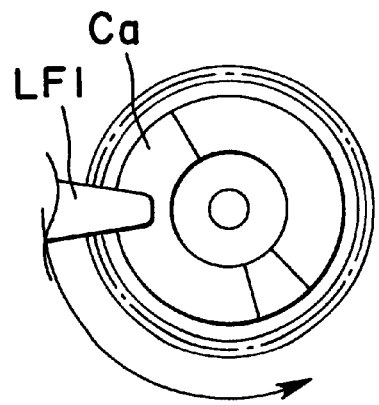

FIGS. 16A to 16C show the state when the guide roller GR is displaced downward. The adjusting cam Ca rotates in a clockwise direction, and the guide roller GR is displaced downward along the cam surface at a lower height Hd.

The adjustment of the height of the adjusting cam Ca will be explained with reference to FIG. 14B. A cam gear Cg is rotatably fitted into the shaft L1 of the drum base DB and is always biased upward by a spring CSP. The extreme end of the shaft L1 is formed with a thread, and the height of the cam gear Cg can be adjusted by turning a nut Cn. After the height of the nut Cn has been adjusted, the nut Cn is locked by stopping a setscrew S1. Since the nut Cn and the setscrew S1 can be adjusted from top, the adjustment of height can be made easily by an automatic machine. The normal position is a flat surface and has a certain width and so, a position of a sensor need not be strict.

Figure 17:
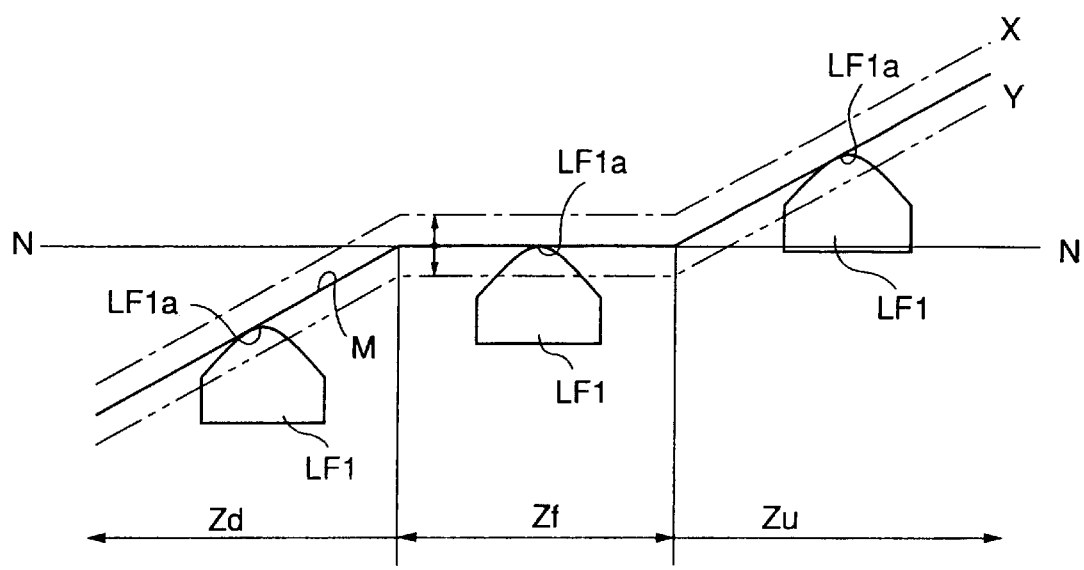
FIG. 17 is an illustration for explaining an operation of a height adjusting cam.

FIG. 17 is an explanatory view of the height adjusting cam Ca. The whole height of the adjusting cam Ca is adjustable in the range from the one-dot chain line X to the two-dot chain line Y. In detail, the whole height of the adjusting cam Ca is adjusted such that a summit LF1a of the lever LF1 of the lower flange LF is positioned at a height shown by a line N—N (the normal position) when it touches the flat surface of the adjusting cam Ca in a region Zf. Regions Zd and Zu illustrate the statuses in that the summit LF1a of the lever LF1 touches rising and falling surface portions indicated by a solid line M of the adjusting cam Ca, respectively.

The lower drum Dd is provided with a lead therearound, which may have a relief at its head and end portions so that an excessive force will not be applied to a magnetic tape which has been recorded by another magnetic reproducing apparatus compatible with the magnetic reproducing apparatus according to the present invention when bend correction for lowering the guide roller GR is conducted.

The height of the pole base PB at the time of tape loading will be explained with reference to FIGS. 18A and 18B. In these figures, reference signs are assigned only to the elements directly related to the change in height of the pole base PB.

Figures 18A, 18B:
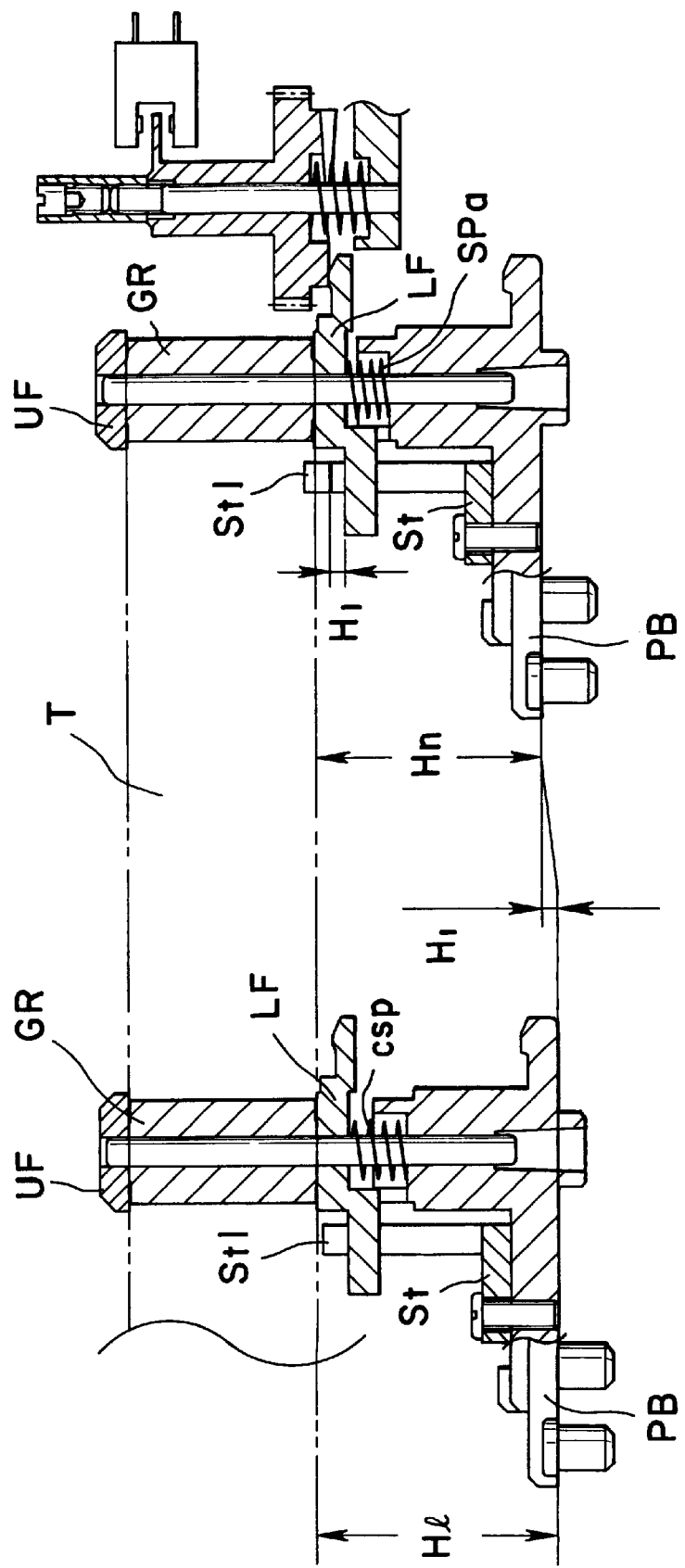
FIGS. 18A and 18B are illustrations for explaining movement of a guide roller during tape loading.

When the loading starts, the guide roller GR is raised upward by the spring CSP and stopped by the stopper St as shown in FIG. 18A (Loading height H10). On the other hand, since the height of the guide roller GR at the normal position when the loading is completed is displaceable upward and downward, the height of the lower flange LF is lower than the hook St1 of the stopper St. Naturally, the height of the guide roller GR as viewed from the pole base PB is lower than that when the loading starts as shown in FIG. 18B (Normal height Hn).

The height of the pole base PB is varied (Hi) so that the height of the magnetic tape T is not varied immediately before termination of tape loading. This avoids damage to the magnetic tape that would happen when the height of the guide roller GR is made the same from start of loading to end thereof. In this case, the magnetic tape T would run on the upper flange UF or the lower flange LF, or fall.

FIG. 19 shows another embodiment of a guide roller GR1. An adjusting cam Ca1 has the construction for pushing down an upper flange UF1 of the guide roller GR1. This construction is the same as FIGS. 13A to 16C except that the upper flange UF1 is tapered more than those shown in those figures, on which the adjusting cam Ca1 are adjusted so that the guide roller GR1 is moved up and down by the upper flange UF1.

FIG. 20 shows still another embodiment of a guide roller GR2. In this embodiment, a stopper Sta is put laterally into a portion in which a diameter of a shaft Sf1 is small.

FIG. 21 shows a further embodiment of a guide roller GR3. A spring SPb is provided under a pole base PBa to always pull downward the guide roller GR3 between the pole base PBa and a spring holder SH pressed into the lower end of a shaft Sf2. Root portions SHa of the spring holder SH are fitted into slits of the pole base PBa to constitute a whirl-stop. The displacing direction in the height direction, and the height of the pole base at the time of loading are opposite to the direction described previously. Through FIGS. 19 to 21, reference signs are assigned only to the elements featured in the embodiments for brevity.

Other embodiments of guide poles (tape guides) provided at supply and take-up reel sides will be described with reference to FIGS. 22A to 26B.

Figure 22B:
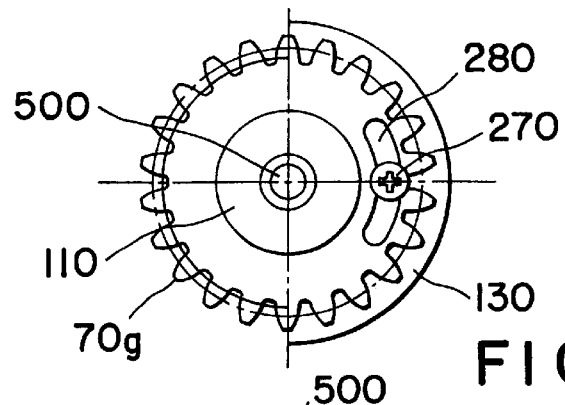
FIGS. 22A and 22B are illustrations of a guide pole provided on a pole base.
Figure 22A:
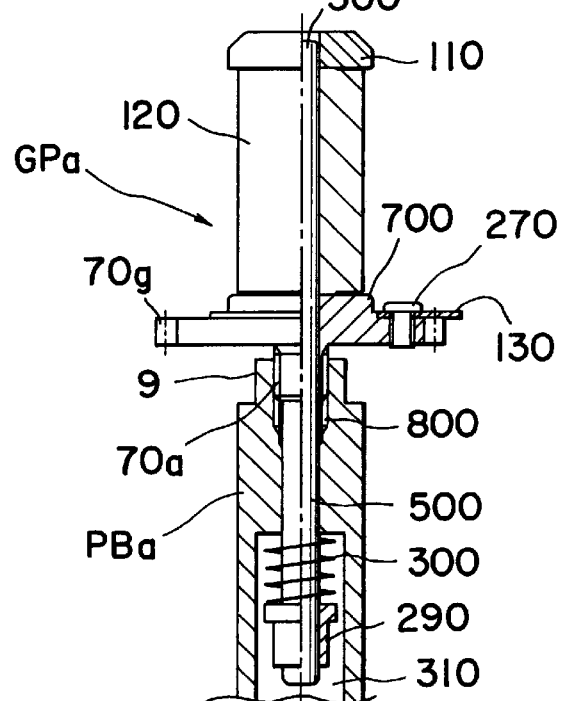

A guide pole GPa shown in FIGS. 22A and 22B is provided with a lower flange 700 and a gear 70g. On a portion of the gear 70g, a shield plate 130 is mounted by a screw 270 through a slot 280 of the shield plate 130 after it is adjusted to a predetermined rotational phase. The lower flange 700 is fixed around a shaft 500 that goes through the guide pole GPa and a pole base PBa formed with a female thread 800. Engaged with the female thread 800 is a male thread 70a formed at the outer surface of a boss of the gear 70g. The female thread 800 is longer than the male thread 70a so that the guide pole GPa will be deviated to a center line of the shaft 500 while rotating.

A stud 290 is provided in a cavity 310 at the lower end portion of the shaft 500. A spring 300 is provided between the upper surface of the stud 290 and the upper wall portion of the cavity 310. The spring 300 always pulls down the guide pole GPa to achieve complete engagement of the threads 70a and 800. Hence, the gear 70g provided as a secondary gear at the height adjustment mechanism at pole base side is never rotated by any external force. The gear 70g is rotated only by engagement with a primary gear provided at the height adjustment mechanism at the fixed section.

Figures 23A, 23B, 23C:
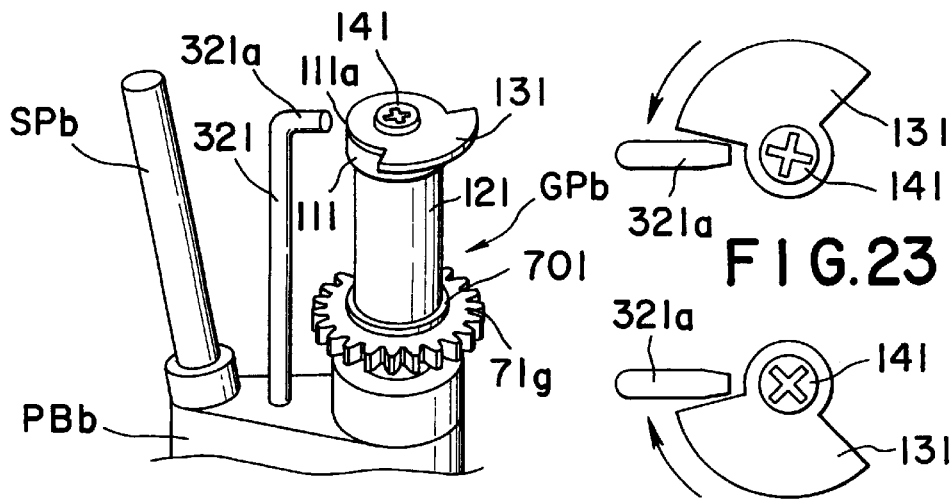
FIGS. 23A to 23C are illustrations of another guide pole provided on a pole base.

Next, as shown in FIGS. 23A and 23B, a guide pole GPb is provided with an upper flange 111. A shied plate 131 is mounted on a protrusion 111a of the upper flange 111. The guide pole GPb is further provided with a stopper 321 such that an operational portion 321a of the stopper 321 is positioned in an orbit of the shield plate 131. The stopper 321 restricts the movement of the shield plate 131 so as not to rotate more than one time.

Figure 24B:
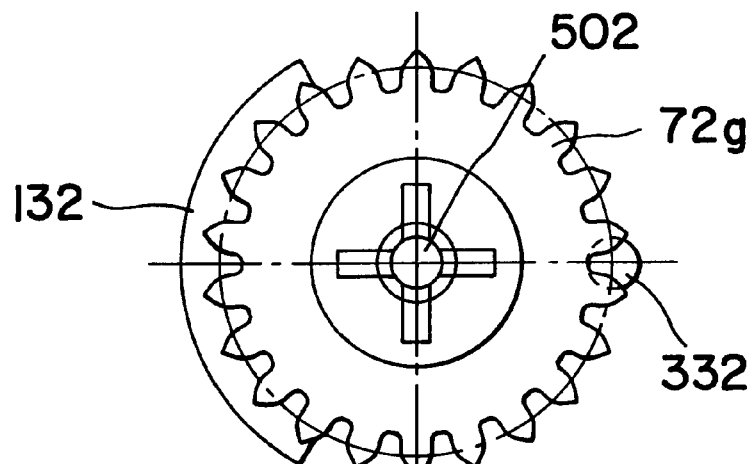
FIGS. 24A and 24B are illustrations of still another guide pole provided on a pole base.
Figure 24A:
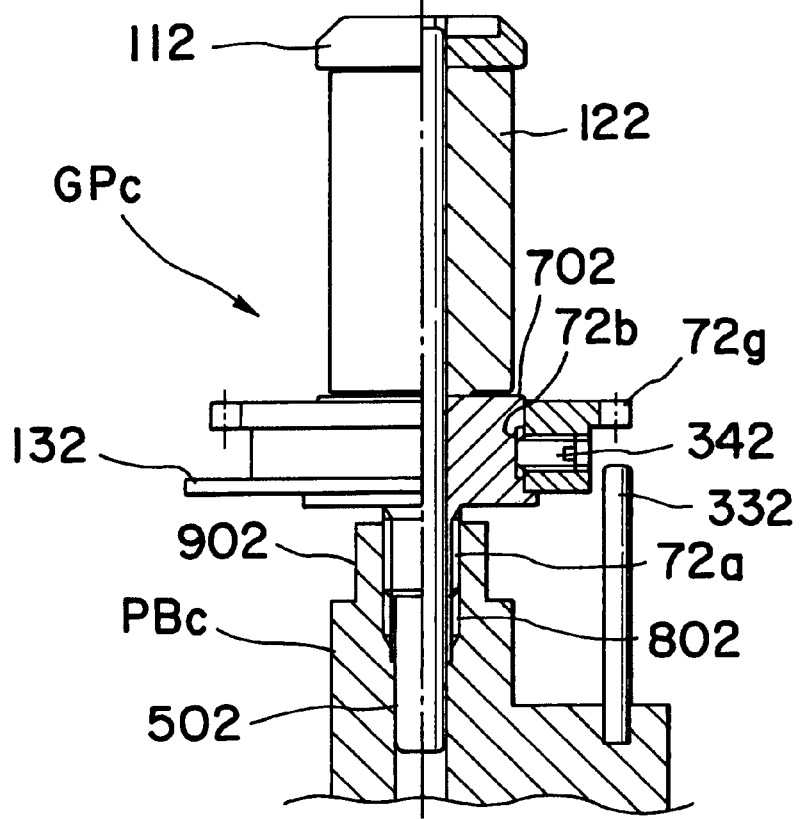

As shown in FIGS. 24A and 24B, a guide pole GPc is provided with a lower flange 702. A shied plate 13 is mounted on the lower surface of a gear 72g formed at the lower flange 702. Further, a stopper 332 is provided in an orbit of the shield plate 132. The stopper 332 also restricts the movement of the shield plate 132 so as not to rotate more than one time.

Figure 25C:
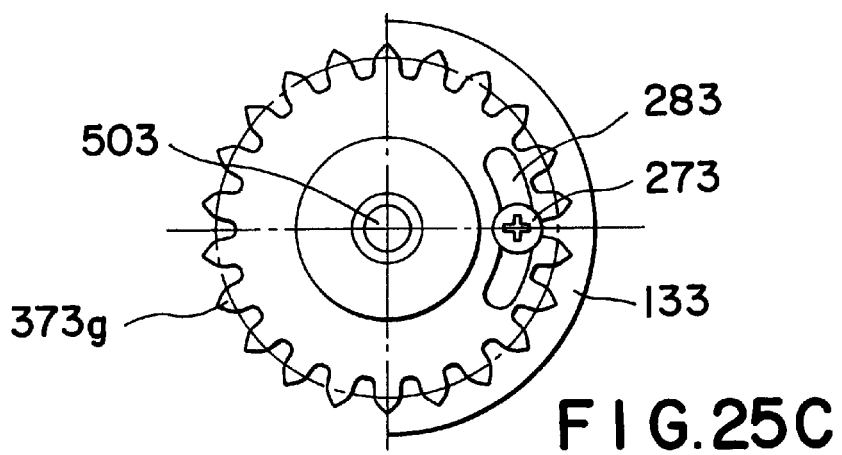
FIGS. 25A to 25C are illustrations of a further guide pole provided on a pole base.
Figure 25B:
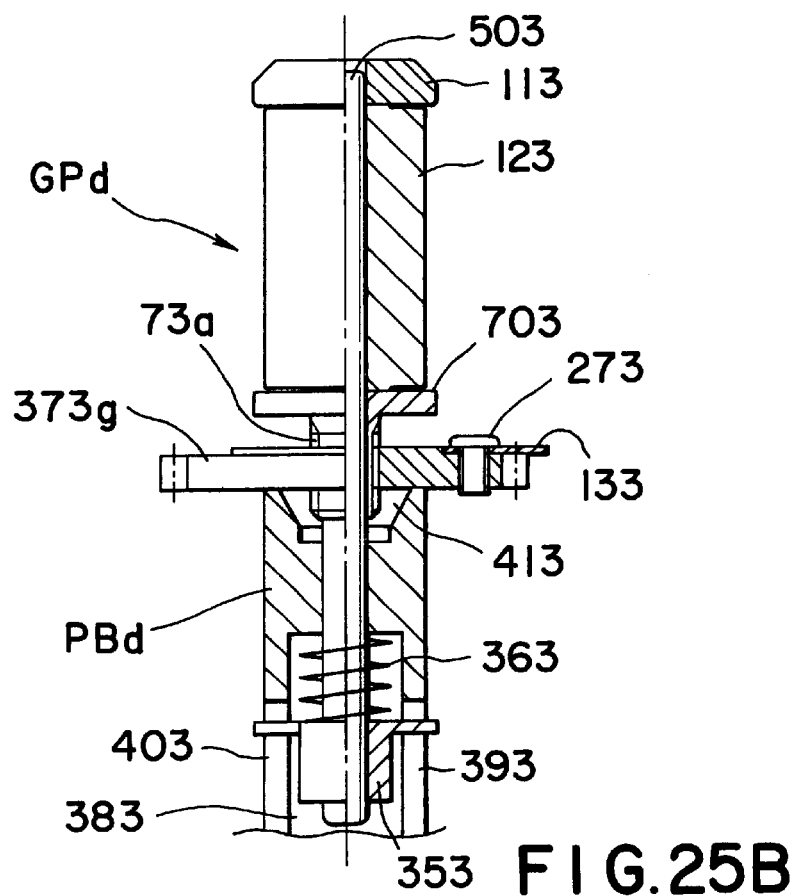
Figure 25A:
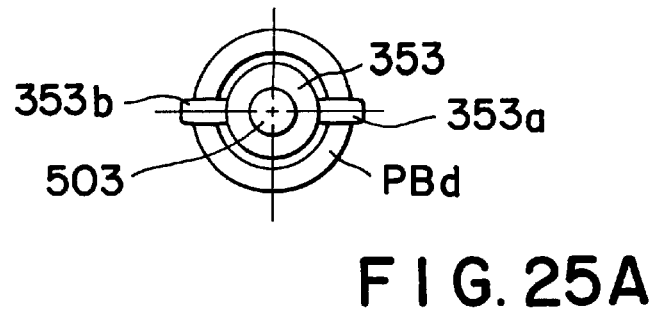

Next, as shown in FIGS. 25A to 25C, a guide pole GPd is provided with a male thread 73a formed around the lower protrusion of a lower flange 703 formed around a shaft 503. The male thread 73a is engaged with a female thread (not shown) formed at the center hole of a gear 373g. A shield plate 133 is mounted on the gear 373g by a screw 273 through a slot 283 of the shield plate 133 after it is adjusted to a predetermined rotational phase. The shaft 503 goes through the lower flange 703 and an upper flange 113 and is provided with a stud 353 at its lower end portion. The stud 353 is provided with protrusions 353a and 353b as a whirl-stop. The lower end portion of the shaft 503 and the stud 353 protrude in a cavity 383 of a pole base PBd. The protrusions 353a and 353b are loosely inserted into slits 393 and 403, respectively.

A spring 363 is provided between the upper surface of the stud 353 and the upper wall portion of the cavity 383 provided in the pole base PBd. The spring 363 always pulls down the guide pole GPd to achieve complete engagement of the male thread 73a and the female thread formed at the center hole of the gear 373g. Hence, the gear 373g provided as a secondary gear at the height adjustment mechanism at pole base side is never rotated by any external force. The gear 373g is rotated only by engagement with a primary gear provided at the height adjustment mechanism at the fixed section.

Next, a guide pole GPe as shown in FIGS. 26A to 26C is provided with a shaft 504. The lower end portion of the shaft 504 protrudes from the lower portion of a pole base PBe. A gear 54a formed around the lower end portion of the shaft 504 is engaged with a female thread (not shown) formed in the center hole of a gear 374g. A shield plate 134 is mounted on the gear 374g by a screw 274 through a slot of the shield plate 134 after adjusted to a predetermined rotational phase. The shaft 504 goes through a lower flange 704 and an upper flange 114. A whirl-stop 444 is provided in a hole 74b formed at the lower surface of the lower flange 704 and also in a hole 454 in the pole base PBe.

A spring 434 is provided between the lower portion of a convex 424 formed at the upper portion of the pole base PBe and the lower surface of the lower flange 704. The spring 434 always pushes up the guide pole GPe to achieve complete engagement of the male thread 54a and the female thread formed at the center hole of the gear 374g. Hence, the gear 374g provided as a secondary gear at the high adjustment mechanism at pole base side is never rotated by any external force. The gear 374g is rotated only by engagement with a primary gear provided at the high adjustment mechanism at the fixed section.

With reference to FIGS. 22A to 26C, only the elements featured in the embodiments have been described.

Figure 27:
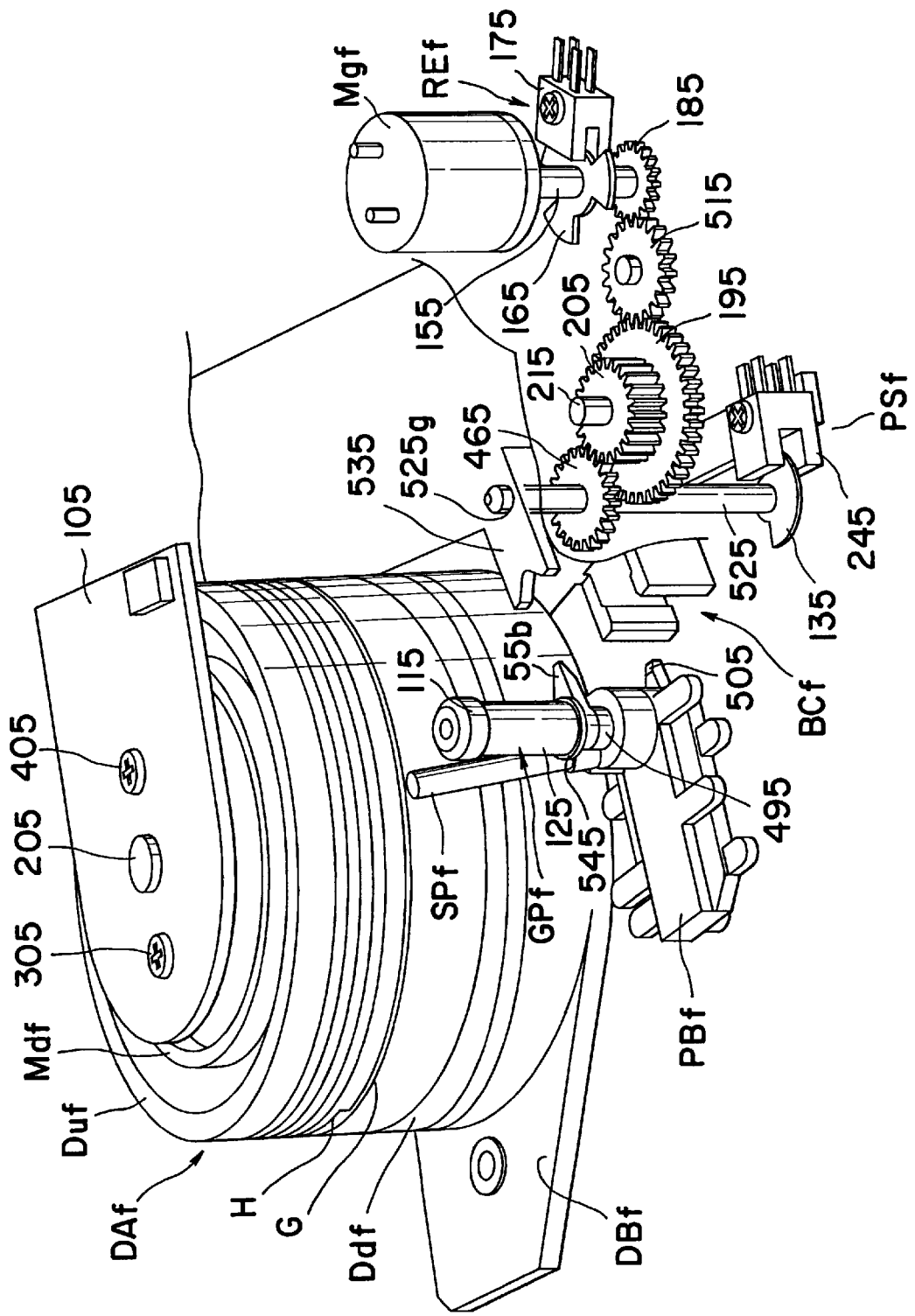
FIG. 27 is a perspective illustration of another embodiment of the magnetic recording and reproducing apparatus according to the present invention during tape loading.

FIG. 27 shows another embodiment of the magnetic recording and reproducing apparatus according to the present invention. A difference between this and those shown in FIGS. 3 to 5 is that the former has a gear 515 engaged with gears 185 and 195.

Figures 28A, 28B, 28C:
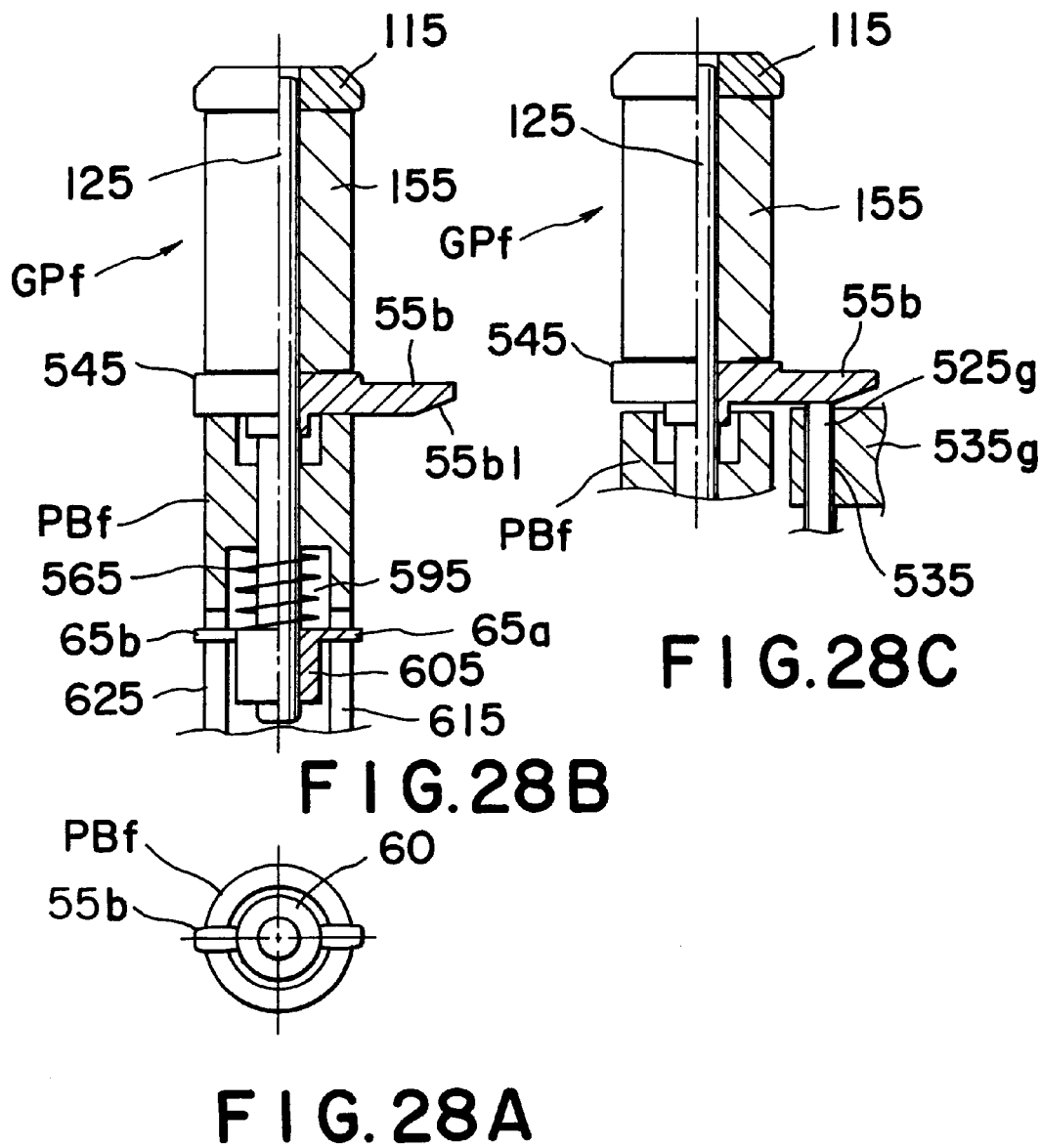
FIGS. 28A to 28C are illustrations of a guide pole provided on a pole base.

FIGS. 28A to 28C show a pole base PBf in a magnetic recording and reproducing apparatus shown in FIG. 27. A shaft 125 of a guide pole GPf has its lower portion inserted into a hole formed in the pole base PBf, and the shaft 12 can be slidably moved while being guided in the moving direction by the wall surface of the hole.

An upper flange 115 is secured to the shaft 125, and a roller 135 has a length equal to a width of a magnetic tape. A lower flange 545 is formed with an engaging portion 55b capable of engaging the extreme end portion of a thread 525g provided in the vicinity of the upper end of the rotational shaft 525 of a gear 465 of FIG. 27.

The engaging portion 55b is provided with an inclined portion 55b1 in order that in the tape loading operation, the extreme end of the provided in the vicinity of the upper end of the rotational shaft 535 of the gear 535g may easily be engaged with the lower surface of the engaging portion 55b of the lower flange 545. A collar 605 is secured to the lower end of the shaft 125. The collar 605 is provided with projections 65a and 65b as a whirl-stop.

The lower end of the shaft 125 for the guide pole GPf and the stop 605 are projected into a cavity 595 provided in the pole base PBf, and the projections 65a and 65b are loosely fitted in slits 615 and 625, respectively, provided in the pole base PBf. A spring 565 is provided between the upper surface of the stop 605 and the upper wall of the cavity 595. The guide pole GPf is always biased so as to be pulled downward by the spring 565. The thread 525g is engaged with an internal thread 535g formed in a projection 535 in the drum base DBf.

When the magnetic recording and reproducing apparatus is shifted from the state that the loading operation illustrated in FIG. 27 is halfway to the state that the loading operation is completed (not shown), the extreme end of the pole base PBf is connected to a base catcher BCf so that the pole base PBf is set to a cavity position having a predetermined positional relationship with respect to the fixed section of the magnetic recording and reproducing apparatus.

When the magnetic recording and reproducing apparatus assumes the state that the loading operation is completed, there assumes the state that the lower surface of the engaging portion 55b formed at the extreme end of the lower flange 545 is engaged with the extreme end of the thread 525g in the upper portion of the rotational shaft 525 of the gear 465. Here, the lower flange 545 is used as a member which functions as a part of the constituent member provided on the pole base side in the height control mechanism. On the other hand, The gear 465 is used as a member which functions as a constituent member provided on the fixed side in the height control mechanism.

In the magnetic recording and reproducing apparatus according to the present invention shown in FIG. 27, the recording and reproducing operation starts after the loading operation by the loading mechanism has been completed. Then, when the motor Mg rotates, the gear 465 is rotated through the gears 185, 515, 195 and 205 of the power transfer system. When the gear 465 rotates, the treads 525g formed in the upper part of the rotational shaft 525 of the gear 465 is engaged with the thread 535g formed in the projection 535 in the drum base DBf. Therefore, the rotational shaft 525 of the gear 465 moves upward or downward in accordance with the rotational direction.

When the rotational shaft 525 rotates, a shield plate 135 of a position sensor PSf, mounted on the lower portion of the rotational shaft 525 rotates, and a position signal is output from a photointerpreter 245 of the position sensor PSf. Further, when the rotational shaft 525 moves upward or downward while rotating, the engaging portion 55b formed in the extreme end of the lower flange 545 also moves upward or downward as the rotational shaft 525 moves upward or downward. Accordingly, the guide pole GPf moves upward or downward by the rotation of the motor Mgf.

Figure 29:
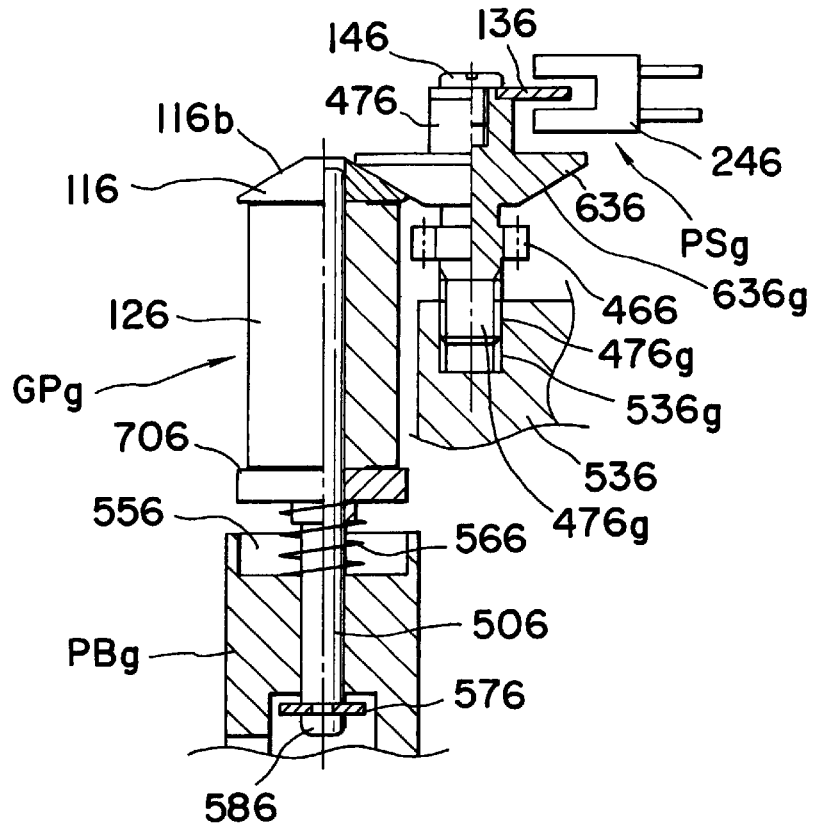
FIG. 29 is an illustration of another guide pole provided on a pole base.

An embodiment illustrated in FIG. 29 will now be explained. A guide pole GPg shown in FIG. 29 which can be applied to the magnetic recording and reproducing apparatus of FIG. 27 has a configuration in which an inclined surface 116b is formed in the upper surface of an upper flange 116 in the guide pole GPg. In the constitution illustrated in FIG. 29, when the magnetic recording and reproducing apparatus of FIG. 27 has completed the loading operation, the inclined surface 116b of the upper surface of the flange 116 in the guide pole GPg is placed in engagement with an engaging inclined surface 636g of an engaging member 636 provided on a rotational shaft 476 of a gear 466 used as a member which functions as a constituent member provided on the fixed side in the height control mechanism.

When the recording and reproducing operation is started and the motor Mgf of FIG. 27 is rotated, the gear 466 corresponding to the gear 465 of FIG. 27 is rotated through the gears 185, 515, 195 and 205 of FIG. 27 of the power transfer system. Then a thread 476g formed in the lower portion of the rotational shaft 476 is engaged with an internal thread 536g formed in a projection 536 in the drum base DBf of FIG. 27 for rotation thereof. Therefore, the engaging member 636 provided on the rotational shaft 525 of the gear 466 moves upward or downward in accordance with the rotational direction. Thereby, as the engaging member 636 moves upward or downward, the guide pole GPg is moved upward or downward by the rotation of the motor Mgf.

Figure 30:
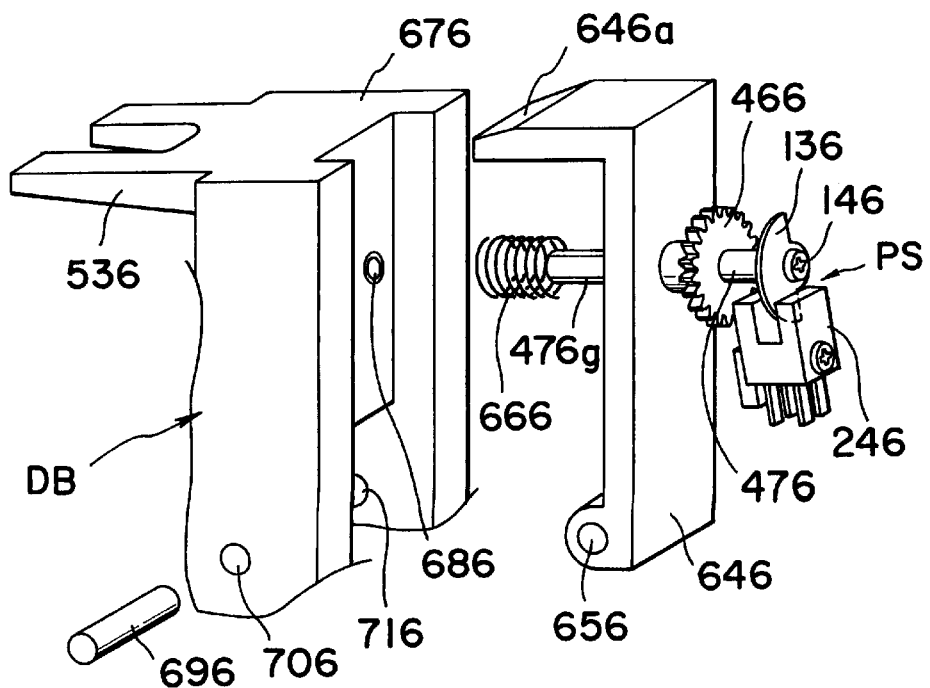
FIG. 30 is a perspective view of a height adjusting mechanism at a fixed section of the magnetic recording and reproducing apparatus according to the present invention.
Figure 31B:
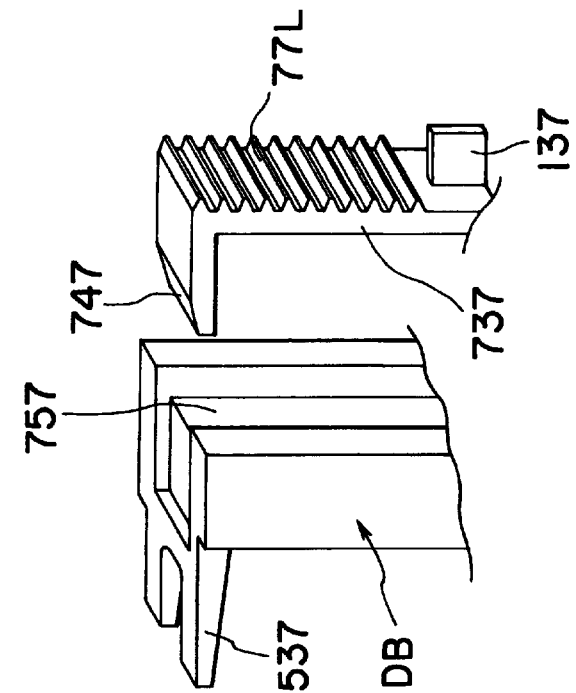
FIG. 31A and 31B are perspective views of another height adjusting mechanism at a fixed section of the magnetic recording and reproducing apparatus according to the present invention.
Figure 31A:
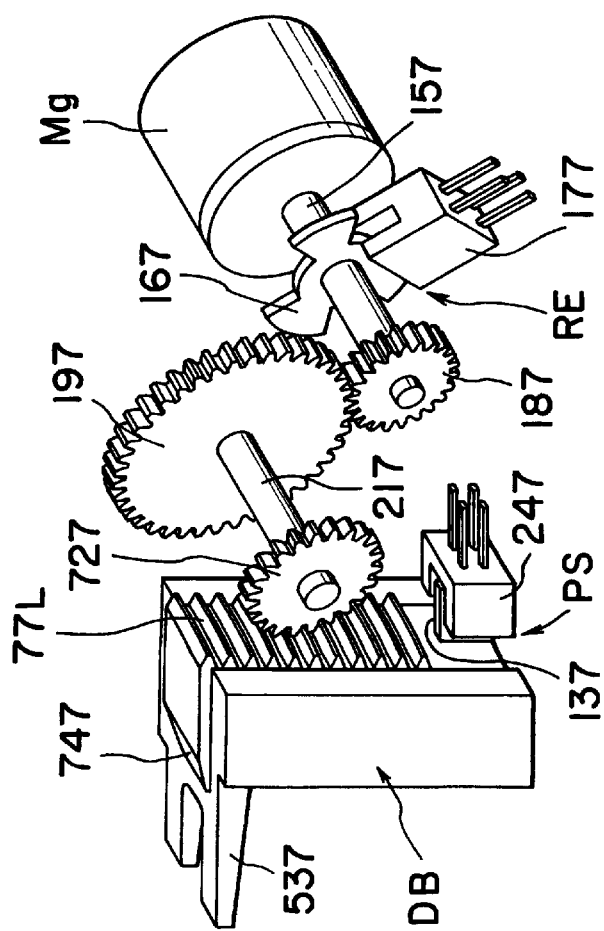

Next, FIGS. 30, 31A and 31B show examples of the constituent members provided on the fixed section in the height control mechanism. The constituent member is used to control the height of the guide pole GPf shown in FIGS. 28A to 28C.

First, FIG. 30 shows a projection 536 formed in a drum base DB and an L-shaped bracket 646. A hole 656 provided at the lower portion of the L-shaped bracket 646 is placed in communication with holes 706 and 716 provided in the projection 536 in the drum base DB, and the L-shaped bracket 646 is combined with the projection 536 in the drum base DB. A pin 696 is inserted through the holes 706 and 656 and 716. Thereby, the L-shaped bracket 646 is connected rotatably to the projection 536 in the drum base DB with the pin 696 as a rotational shaft.

In FIG. 30, a shield plate 136 in a reference position sensor PS is secured to one end of a rotational shaft 476 of the gear 466. A thread 476g is formed in the other end of the rotational shaft 476. The thread 476g is inserted through the spring and then engaged with an internal thread 686 formed in the projection 536 in the drum base DB.

When the thread 476g of the rotational shaft 476 of the gear 466 is rotated in the state that the former are engaged with the internal thread 686 formed in the projection 536 in the drum base DB, the L-shaped bracket 646 connected rotatably to the projection 536 in the drum base DB rotates about the pin 696, whereby an extreme end 646a of the L-shaped bracket 646 moves laterally.

When the magnetic recording and reproducing apparatus assumes the state that the loading operation has been completed, the lower surface of the engaging portion 55b formed at the extreme end of the lower flange 545 in FIGS. 28A to 28C is engaged with the surface of the extreme end 646a of the L-shaped bracket 646 used as a member which functions as a constituent member provided on the fixed side in the height control mechanism.

After the loading operation by the loading mechanism has been completed and when the recording and reproducing operation is started to rotate the motor Mgf, the gear 46 is rotated through the gears 185, 515, 195 and 205 of the power transfer system of FIG. 27 as described above. When the thread 476g of the rotational shaft 476 of the gear 466 is rotated while being engaged with the internal thread 686 formed in the projection 536 in the drum base DB, the engaging portion 55b formed at the extreme end of the lower flange 545 of FIGS. 28A to 28C in contact with the surface of the extreme end 646*a* of the L-shaped bracket 646 also moves upward or downward. Accordingly, the guide pole GPf is moved upward or downward by the rotation of the motor Mgf. Further, when the gear 465 rotates, the rotational shaft 525 of the gear 465 rotates. Then, the shield plate 135 of the reference position sensor PSf mounted on the lower portion of the rotational shaft 525 rotates, and a position signal is output from the photointerpreter 246 of the position sensor PSf.

Next, FIGS. 31A and 31B show a projection 537 formed in the drum base DB and a rack plate 737. A rack 77L is provided on the rack plate 737. A shield plate 137 of a reference position sensor PS is also mounted on the rack plate 737. An inclined surface 747 is constituted on the end of the rack plate 737. The upper surface of the rack plate 737 functions as a constituent member provided on the fixed side in the control mechanism. A photointerpreter 247 of the position sensor PS is also provided. The rack plate 737 is slidably mounted in a recess 757. A pinion 727 is meshed with the rack 77L of the rack plate 737. A gear 197 is mounted on a rotational shaft 217 of the pinion 727.

The gear 197 is meshed with a gear 187 mounted on a rotational shaft 157 of the motor Mg. A shield blade 167 constituting a part of the rotary encoder RE is also mounted on the rotational shaft 157 of the motor Mg. A photointerpreter 177 constitutes a part of the rotary encoder RE.

When the magnetic recording and reproducing apparatus assumes the state that the loading operation has been completed, the lower surface of the engaging portion 55*b* formed at the extreme end of the flange 545 of FIGS. 28A to 28C is placed in engagement with the upper surface of the rack plate 737 used as a member which functions as a constituent member provided on the fixed side in the height control mechanism.

After the loading operation by the loading mechanism has been completed and when the recording and reproducing operation is started to rotate the motor Mg, the pinion 727 is rotated through the gears 185 and 195 of the power transfer system of FIG. 27 as described above so that the rack 737 meshed with the pinion 727 moves upward or downward. Thereby, the engaging portion 55*b* formed at the extreme end of the lower flange 545 in contact with the upper surface of the rack plate 737 also moves upward or downward. Accordingly, the guide pole GP is moved upward or downward by the rotation of the motor Mg. Further, when the pinion 727 rotates so that the rack 737 meshed with the pinion 727 moves upward or downward, the shield plate 137 of the position sensor PS mounted on the rack plate 737 also moves, and a position signal is output from the photointerpreter 247 of the position sensor PS.

An embodiment of a guide roller (guide pole) GR according to the present invention will be described.

Figure 32B:
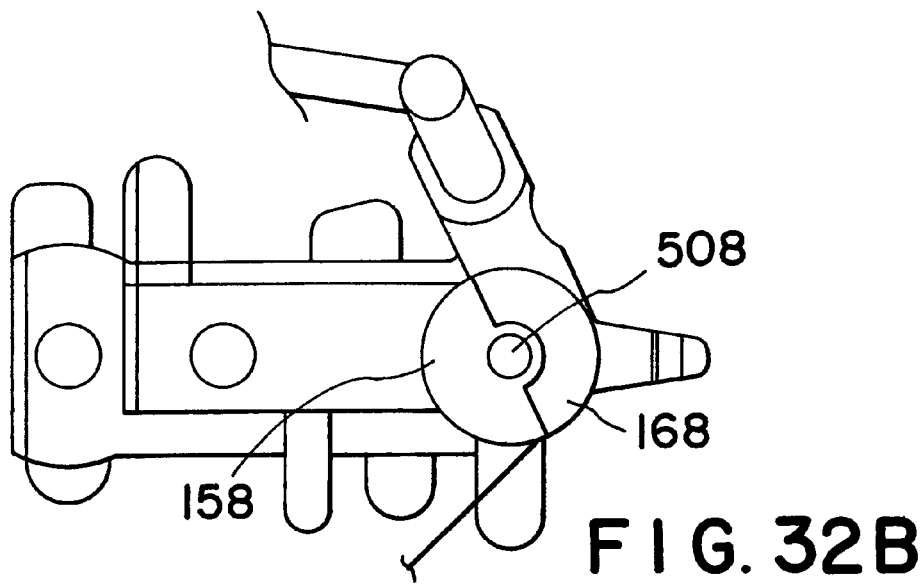
FIGS. 32A and 32B are a sectional view and a plan view, respectively, of a guide roller provided on a pole base.
Figure 32A:
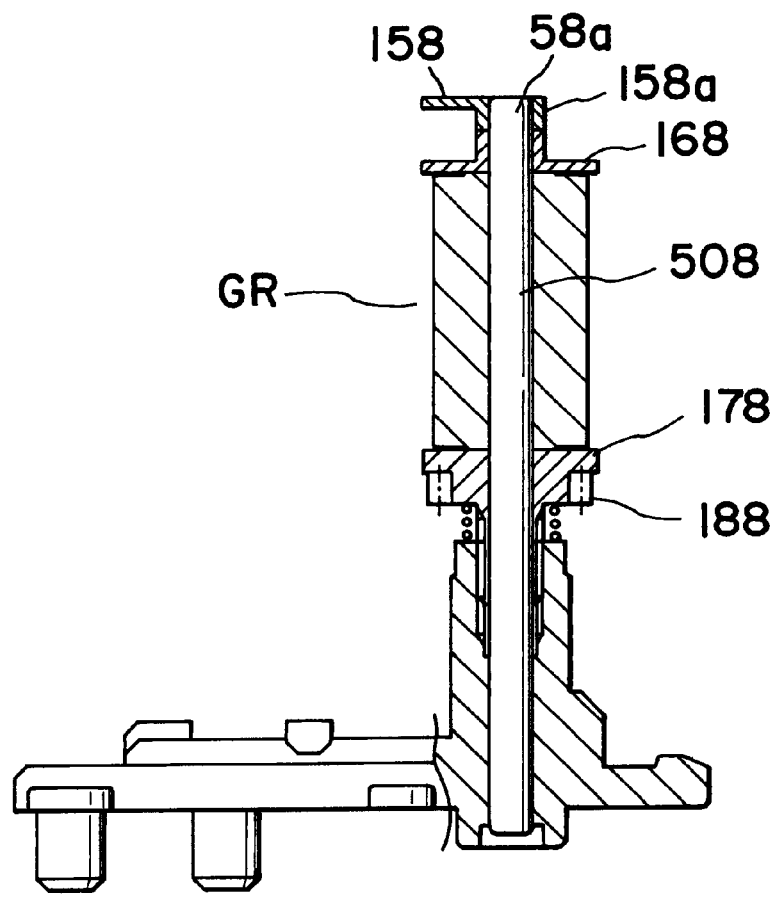

Shown in FIGS. 32A and 32B, a shield plate 158 is integrally molded of resin. An upper flange 168 and a shaft 508 are pressed in. A fitting portion 158*a* of the shield plate 508 is fitted into an extreme end 58*a* of the shaft 508 after a phase relative to a reference position sensor has been adjusted. A large diameter portion of the shield plate 158 is smaller than an outside diameter of the upper and lower flanges 168 and 178. An outside diameter of a gear 188 is also smaller than that of the upper and lower flanges 168 and 178.

Figure 33:
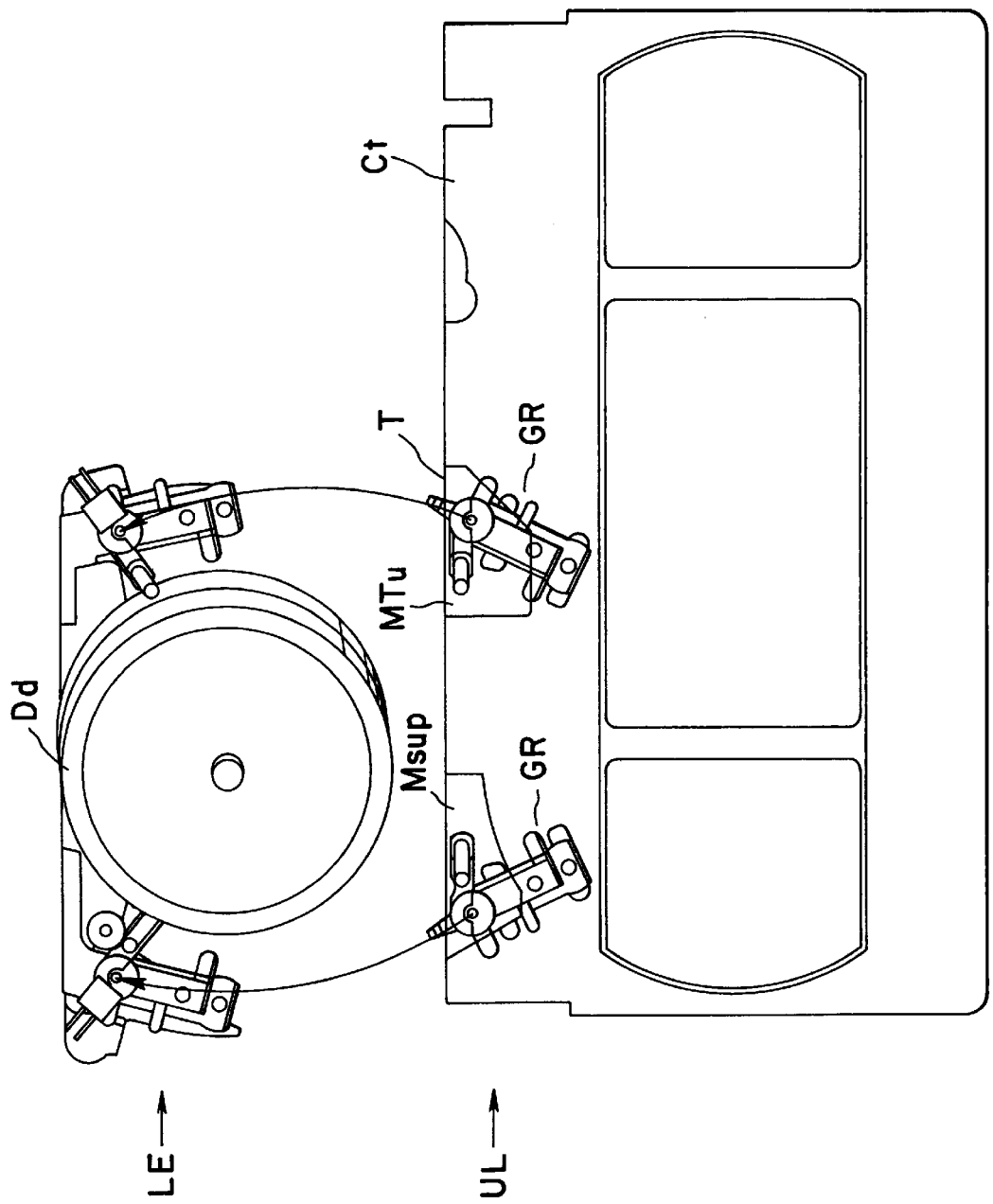
FIG. 33 is an illustration of a guide roller and openings of a cassette.

FIG. 33 is an explanatory view of an opening of the guide roller GR of FIGS. 32A and 32B and a cassette Ct.

There is shown the cassette Ct, a magnetic tape T, a side opening Msup, a side opening Mtu, and a drum Dd. Also shown is an unloading position UL and a loading completion position LE of the guide roller GR.

When the cassette Ct is mounted, the guide rollers GR enter the openings Msup and Mtu of the cassette Ct with a little cl.earance among the upper and lower flanges 168 and 178, the wall of the cassette Ct and the magnetic tape T.

If the large diameter portion of the shield plate 158 and the outside diameter of the gear 188 of FIGS. 32A and 32B are larger than outside diameter of the upper and lower flanges 168 and 178, they will sometimes rub the wall of the cassette Ct and the magnetic tape T. However, they are smaller than the outside diameter of the upper and lower flanges 168 and 178 as described above, no rubbing occurs.

A reference position sensor on the fixed section is positioned in the vicinity of the detection end of the shield plate 158 of the guide roller GR after completion of loading, which will be a normal position.

Figure 34A:
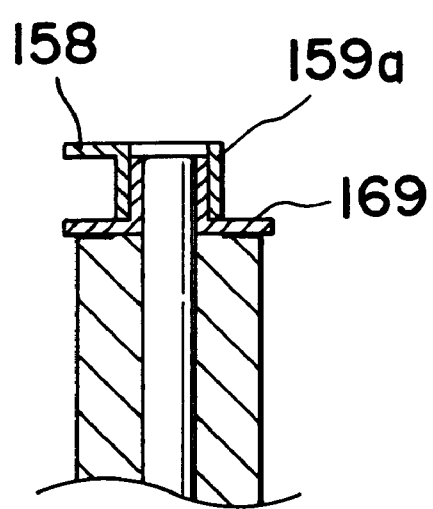
FIGS. 34A and 34B are illustrations of guide rollers.
Figure 34B:
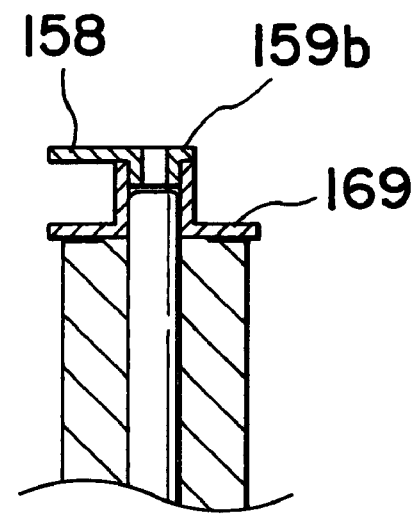

FIG. 34A shows an embodiment of the guide roller GR shown in FIGS. 32A and 32B in which a fitting portion 159*a* of a shield plate 158 is pressed into a small diameter portion 169 of the upper flange 168 of FIG. 32A. FIG. 34B shows an embodiment in which a fitting portion 159*b* of the shield plate 158 is pressed into an inside diameter portion 169 of the upper flange 168.

The shield plate 158 may be formed with, other than the resin, a pressed sheet metal or another material with a resin fitting portion and a sheet metal plate portion.

According to the present invention described above, reference height data of tape guides (guide poles or guide rollers) obtained in accordance with the standard heights for compatibility in recording and reproduction are stored in a memory. The height adjusting mechanism detects heights of the tape guides when tape loading is completed and adjusts their heights to the standard heights with reference to the stored data. A high compatible recording and reproduction thus can be achieved among magnetic recording and reproducing apparatuses with the same recording and reproduction standard.

Further, according to the present invention, heights of the tape guides provided at supply reel and take-up reel sides, respectively, can be adjusted by a closed-loop automatic control under control signals generated based on curve data on recorded tracks on a standard magnetic tape. This achieves automatic tape guide height control only by reproducing the standard magnetic tape in shipping adjustment.

Further, according to the present invention, a backlash amount of a gear of the power transfer system of the magnetic recording and reproducing apparatuses is measured as the number of pulses generated by a rotary encoder and used for correcting heights of tape guides. This achieves accurate tape guide height adjustment.

Further, according to the present invention, tape guides provided at supply reel and take-up reel sides, respectively, are displaced in height to correct a track bend, wherein a position, at the time of recording and normal reproduction, of a displacing mechanism for displacing the tape guides in the height direction is made adjustable, and at the time of recording and normal reproduction, the position is always maintained. Since the adjusting cam has a flat surface of a width, a position of a sensor needs not be strict.

Therefore, the present invention achieves a magnetic recording and reproducing apparatus for correcting a track bend by solving the problems of a conventional magnetic recording reproducing apparatus such that (1) the recording and normal reproducing position of tape guides is possibly changed depending on detection accuracy of the sensor and change after passage of time; (2) the reproducibility of the recording and normal reproducing position would be deteriorated due to the play and backlash of the drive gear; and (3) in the case where a rotation detecting disk is mounted on tape guides, the recording and normal reproducing position cannot be detected if the tape guides rotate more than once.

Further, according to the present invention, a large diameter portion of a shield plate for detecting a position of a tape guide and an outside diameter of a gear for driving the tape guide are made smaller than a diameter of upper and lower flanges of the tape guide. This configuration can avoid damage to the tape guide or a cassette that would happen when the cassette is inserted or removed, the shield plate or the drive gear will touch cassette walls.

Further, according to the present invention, a mounting portion of a shield plate for detecting a position of a tape guide is formed from an elastic body and is locked by being pressed and fitted into a small diameter portion of an upper flange of the tape guide or pressed and fitted into a shaft extended over the upper flange. This configuration can solve the problems on a conventional magnetic recording and reproducing apparatus such that the number of steps for tightening screws increases; the screw head protrudes on the shield plate; and since a thread hole has to be bored in the flange, a press-in allowance for the upper flange and the shaft cannot be taken.

What is claimed is:

1. A magnetic recording and reproducing apparatus comprising:

a supply reel and a take-up reel around which a magnetic tape is to be wound;

a first tape guide provided in the vicinity of a rotary head at the supply reel side;

a second tape guide provided in the vicinity of the rotary head at the take-up reel side, the first and second tape guides being movable in directions of a width of the magnetic tape;

a first detector to detect a height of said first tape guide;

a second detector to a height of said second tape guide;

a first counter and a second counter to obtain a count value corresponding to each detected height of said first and second tape guides respectively;

an adjuster to adjust the height of at least either the first or the second tape guide so that the count value becomes equal to a reference value; and means for setting the count value of said first and/or second counter to a specific value when the detected height becomes a reference height corresponding to the reference value after the magnetic tape has been wound around the supply and take-up reels.

2. The apparatus according to claim 1 further comprising an envelope detector to detect an envelope of a signal reproduced from the magnetic tape, the adjuster adjusting the height of at least either the first or the second tape guide so that the envelope becomes flat.

3. The apparatus according to claim 1, wherein the adjuster has biasing means for biasing each tape guide in one direction, and a stopper for each tape guide to maintain each tape guide at a fixed height.

4. The apparatus according to claim 1, wherein each tape guide is provided on a pole base, the adjuster varies the height of at least either one of the tape guides at a first moment of starting magnetic tape loading and also varies a height of at least either one of the pole base at a second moment immediately before termination of the loading to maintain a specific height of the magnetic tape through the first to second moments.

5. The apparatus according to claim 1, wherein the adjuster has an inclined surface and a flat surface for each tape guide touching a portion of each tape guide for adjusting the height of each tape guide, the flat surfaces also touching the portion of each tape guide when recording and reproducing.

6. The apparatus according to claim 1, wherein each tape guide is provided on a pole base with a stopper to restrict rotation of each tape guide not more than once.

7. The apparatus according to claim 1, wherein each tape guide is provided with a rotary shaft formed with a thread engaged with a gear of the adjuster, the apparatus further comprising means for preventing backlash of the thread.

8. The apparatus according to claim 1, wherein each tape guide is adjustable on an upper and a lower portion thereof in an axis direction thereof.

9. The apparatus according to claim 8, wherein each tape guide is adjustable via a spring on the upper and lower portions.

10. The apparatus according to claim 1, wherein each tape guide is provided with a shield plate that cooperates with a photointerpreter of each of the first and second detectors for detecting the height of each tape guide, and each tape guide is formed with an upper and a lower flange, a diameter of the shield plate being smaller than diameters of the upper and lower flanges.

11. The apparatus according to claim 1, wherein each tape guide is provided with a rotary shaft formed with a thread engaged with a gear of the adjuster, and each tape guide is formed with an upper and a lower flange, a diameter of the gear being smaller than diameters of the upper and lower flanges.

12. The apparatus according to claim 1, wherein each tape guide is provided with a shield plate formed of an elastic body that cooperates with a photointerpreter of the first and second detectors for detecting the height of each tape guide, and each tape guide is formed with an upper and a lower flange, the shield plate being pressed and fitted into a specific diameter portion of the upper flange.

13. The apparatus according to claim 1, wherein each tape guide is provided with a rotary shaft and a shield plate formed of an elastic body that cooperates with a photointerpreter of each of the first and second detectors for detecting the height of each tape guide, and each tape guide is formed with an upper and a lower flange, the shield plate being pressed and fitted into a portion of the shaft extended over the upper flange.

14. The apparatus according to claim 1, wherein each tape guide is provided with a shield plate that cooperates with a photointerpreter of each of the first and second detectors for detecting the height of each tape guide, the shield plate being formed of resin.

15. The apparatus according to claim 1, wherein each tape guide is provided with a shield plate that cooperates with a photointerpreter of each of the first and second detectors for detecting the height of each tape guide, the shield plate being formed of metal.

16. The apparatus according to claim 1, wherein each tape guide is provided with a shield plate that cooperates with a photointerpreter of each of the first and second detectors for detecting the height of each tape guide, the shield plate having a fixed portion formed of resin and a plate portion formed of metal.

17. A magnetic recording and reproducing apparatus comprising:

a supply reel and a take-up reel around which a magnetic tape is to be wound;

tape guides provided in the vicinity of a rotary head at the supply reel and the take-up reel sides, the tape guides being movable in directions of a width of the magnetic tape;

a driver to move the tape guides in the tape width direction;

a detector to detect a height of each tape guide and generating a first reference signal when at least either one of the tape guides is moved to a first reference height in a first direction and a second reference signal when at least either one of the tape guides is moved to a second reference height in a second direction opposite to the first direction of the width of the magnetic tape;

a counter to obtain a count value while at least either one of the tape guides is moving; and a memory to store a first number of pulses counted when the first reference signal is generated and a second count value when the second reference signal is generated, the driver moving at least either one of the tape guides based on at least a first difference between the first and the second count values.

18. The apparatus according to claim 17, wherein the driver moves at least either one of the tape guides in the first direction based on the first and the second number of while in the second direction based on the first difference.

19. The apparatus according to claim 17, wherein the driver moves at least either one of the tape guides in the first direction based on a specific number smaller than the first difference while in the second direction based on a second difference between the first difference and the specific number.

20. A magnetic recording and reproducing apparatus comprising:

a supply reel and a take-up reel around which a magnetic tape is to be wound;

tape guides provided in the vicinity of a rotary head at the supply reel and the take-up reel sides, the tape guides being movable in directions of a width of the magnetic tape;

a driver to move the tape guides in the tape width direction;

a counter to obtain a count value while at least either one of the tape guides is moving; and a detector to detect the count number of pulses when at least either one of the tape guides is moved at a specific speed and then stopped, the driver moving at least either one of the tape guides based on the detected count value.

21. The apparatus according to claim 6, wherein the detector detects a first count value when at least either one of the tape guides is moved at the specific speed and then stopped in a first direction and a second count value when at least either one of the tape guides is moved at the specific speed and then stopped in a second direction opposite to the first direction of the width of the magnetic tape, the driver moving at least either one of the tape guides based on the first and the second count values.

* * * * *